United States Patent
Zheng et al.

(10) Patent No.: US 9,609,363 B2
(45) Date of Patent: Mar. 28, 2017

(54) METHOD AND APPARATUS FOR OBTAINING SIZE OF TRANSFORM BLOCK

(71) Applicants: Huawei Technologies Co., Ltd., Shenzhen (CN); Tsinghua University, Beijing (CN)

(72) Inventors: Xiaozhen Zheng, Shenzhen (CN); Yuan Yuan, Beijing (CN); Jianhua Zheng, Beijing (CN); Yun He, Beijing (CN)

(73) Assignees: Huawei Technologies Co., Ltd., Shenzhen (CN); Tsinghua University, Beijing (CN)

( * ) Notice: Subject to any disclaimer, the term of this patent is extended or adjusted under 35 U.S.C. 154(b) by 0 days.

(21) Appl. No.: 15/091,378

(22) Filed: Apr. 5, 2016

(65) Prior Publication Data

US 2016/0219308 A1 Jul. 28, 2016

Related U.S. Application Data

(63) Continuation of application No. 14/144,059, filed on Dec. 30, 2013, now Pat. No. 9,338,454, which is a (Continued)

(30) Foreign Application Priority Data

Aug. 31, 2011 (CN) .......................... 2011 1 0255243
Jan. 21, 2012 (CN) .......................... 2012 1 0019843

(51) Int. Cl.
*G06K 9/46* (2006.01)
*H04N 19/85* (2014.01)
(Continued)

(52) U.S. Cl.
CPC ............ *H04N 19/85* (2014.11); *H04N 19/122* (2014.11); *H04N 19/176* (2014.11); *H04N 19/60* (2014.11); *H04N 19/61* (2014.11); *H04N 19/96* (2014.11)

(58) Field of Classification Search
CPC ........... H04N 19/00775; H04N 19/122; H04N 19/60; H04N 19/61; H04N 19/96
See application file for complete search history.

(56) References Cited

U.S. PATENT DOCUMENTS 9,338,454 B2 * 5/2016 Zheng .................. H04N 19/122
2007/0206679 A1 9/2007 Lim et al.
(Continued)

FOREIGN PATENT DOCUMENTS

| CN | 101019435 A | 8/2007 |
| CN | 101500161 A | 8/2009 |
| CN | 101686395 A | 3/2010 |
| EP | 1351510 A1 | 10/2003 |
| JP | 2005159947 A | 6/2005 |

OTHER PUBLICATIONS

Shaffer et al., "Generalized comparison of quadtree and bintree storage requirements," Image and Vision Computing, vol. 11, Issue 7, pp. 402-412, Virginia Polytechnic Institute and State University, Blacksburg, Virginia (Sep. 1993).
Davies et al., "Suggestions for a Test Model," Joint Collaborative Team on Video Coding (JCT-VC) of ITU-T SG16 WP3 and ISO/IEC JTC1/SC29/WG11, $1^{st}$ Meeting, JCTVC-A033, pp. 1-30, Dresden, Germany (Apr. 15-23, 2010).
Weigand et al., "WD3: Working Draft 3 of High-Efficiency Video Coding," Document JCTVC-E603, Joint Collaborative Team on Video Coding (JCT-VC) of ITU-T SG16 WP3 and ISO/IEC JTC1/SC29/WG11, $5^{th}$ Meeting, Geneva, Switzerland (Mar. 2011).
Series H: Audiovisual and Multimedia Systems; Infrastructure of audiovisual services—Coding of moving video; Advance Video Coding for Generic Audiovisual Services, Recommendation H.264, International Telecommunication Union (May 2003).

*Primary Examiner* — Phuoc Tran
(74) *Attorney, Agent, or Firm* — Leydig, Voit & Mayer, Ltd.

(57) ABSTRACT

The present disclosure provides a method for obtaining a size of a transform block, where the method includes: obtaining a dividing manner of an image block; and obtaining size information of a post-dividing transform block according to the dividing manner of the image block and a width and a height of a pre-dividing transform block. By using the method for obtaining a size of a transform block provided in this embodiment of the present disclosure, a size of a transform block may be coded according to a dividing manner of an image block or a height and a width of a pre-dividing transform block, thereby effectively improving coding efficiency.

21 Claims, 22 Drawing Sheets

Related U.S. Application Data continuation of application No. PCT/CN2012/080857, filed on Aug. 31, 2012.

(51) Int. Cl.
*H04N 19/122* (2014.01)
*H04N 19/61* (2014.01)
*H04N 19/60* (2014.01)
*H04N 19/96* (2014.01)
*H04N 19/176* (2014.01)

(56) References Cited

U.S. PATENT DOCUMENTS

| | | |
|---|---|---|
| 2008/0291997 A1 | 11/2008 | Yoon et al. |
| 2011/0134998 A1 | 6/2011 | Lee et al. |
| 2013/0022107 A1* | 1/2013 | Van der Auwera ............ H04N 7/26117 375/240.03 |
| 2013/0156335 A1* | 6/2013 | Lim ...................... H04N 19/52 382/238 |

* cited by examiner

1st layer

2nd layer

Nx2N dividing

METHOD AND APPARATUS FOR OBTAINING SIZE OF TRANSFORM BLOCK

CROSS-REFERENCE TO RELATED APPLICATIONS

This application is a continuation of U.S. patent application Ser. No. 14/144,059, filed on Dec. 30, 2013, which is a continuation of International Patent Application No. PCT/CN2012/080857, filed on Aug. 31, 2012, which claims priority to Chinese Patent Application No. 201110255243.6, filed on Aug. 31, 2011 and Chinese Patent Application No. 201210019843.7, filed on Jan. 21, 2012, all of which are hereby incorporated by reference in their entireties.

TECHNICAL FIELD

The present disclosure relates to the field of communications technologies, and in particular, to a method and an apparatus for obtaining a size of a transform block.

BACKGROUND

Multiple video compression methods may be used to compress video data in order to minimize a bandwidth required for transmitting the video data as much as possible. The video compression methods include intra-frame compression and inter-frame compression.

Currently, an inter-frame compression method based on motion estimation is often used. Specifically, a process in which a coding end of an image uses the inter-frame compression method to compress and code the image includes: dividing, by the coding end, a to-be-coded image block into several image sub-blocks of a same size; for each image sub-block, searching a reference image for an image block that best matches a current image sub-block and using the image block as a prediction block; subtracting a pixel value of the prediction block from a corresponding pixel value of the current image sub-block to obtain a residual; performing entropy coding on a value obtained after the residual is transformed and quantified; and finally sending a bit stream that is obtained through the entropy coding and motion vector information to a decoding end, where the motion vector information indicates a position difference between the current image sub-block and the prediction block.

After obtaining the bit stream obtained through the entropy coding, the decoding end of the image first performs entropy decoding to obtain the corresponding residual and the corresponding motion vector information; obtains the corresponding matched image block (that is, the prediction block) from the reference image according to the motion vector information; and then adds a value of each pixel point in the matched image block and a value of a corresponding pixel point in the residual to obtain a value of each pixel point in the current image sub-block. The intra-frame prediction is to utilize information inside a current image to predict an image block to obtain a prediction block. The coding end obtains a corresponding pixel of the prediction block according to a prediction mode, a prediction direction, and pixel values around the image block, and subtracts a pixel of the prediction block from the pixel of the image block to obtain a residual, where the residual is written into a code stream after undergoing transform, quantification, and entropy coding; and the decoding end parses the code stream, obtains a residual block after performing entropy decoding, de-quantification, and de-transform on the code stream, obtains the prediction block according to the prediction mode, the prediction direction, and the pixel values around the image block, and adds a pixel of the residual block and the pixel of the prediction block to obtain a reconstructed image block.

Concepts of a coding unit, a prediction unit, and a transform unit exist in a current video coding and decoding standard. The coding unit is an image block operated when a coding end performs coding or a decoding end performs decoding. The prediction unit is an image block that has an independent prediction mode in the coding unit. One prediction unit may include multiple prediction blocks, where a prediction block is an image block operated when a coding unit performs a prediction operation. The transform unit is an image block operated when a coding unit performs a transform operation, and may also be called a transform block. Considering that difference signals inside a prediction block are strongly correlated, large-block transform brings higher energy concentration performance than small-block transform. In a broader sense, one image block may include one or more prediction blocks, and prediction is performed by using a prediction block as a unit at the coding and decoding ends; and meanwhile, one image block includes one or more transform blocks, and transform is performed by using a transform block as a unit at the coding and decoding ends.

In an existing video coding and decoding standard, such as moving picture experts group (MPEG) or H.264/AVC (Advanced Video Coding), one image block, called a macroblock, a super-macroblock, or the like, is divided into several image sub-blocks. Sizes of these image sub-blocks are 16×16, 16×8, 8×16, 8×8, 8×4, 4×8, 4×4, and the like. These sizes of the image sub-blocks are used for the preceding motion estimation and motion compensation. The coding end of the image needs to send a code word that identifies a dividing manner of the image block to the decoding end of the image, so that the decoding end of the image learns a dividing manner at the coding end of the image, and determines a corresponding prediction block according to the dividing manner and motion vector information. In the existing video coding and decoding standard, each of these image sub-blocks is an N×M rectangular block (both N and M are an integer greater than 0), and N and M are in a multiple relationship.

Common manners of dividing an image block into an image sub-block are as follows: a 2N×2N dividing manner, in which an image block includes only one image sub-block, that is, the image block is not divided into smaller image sub-blocks, as shown in FIG. 1a; a 2N×N dividing manner, in which an image block is divided into one upper image sub-block and one lower image sub-block that are of a same size, as shown in FIG. 1b; an N×2N dividing manner, in which an image block is divided into one left image sub-block and one right image sub-block that are of a same size, as shown in FIG. 1c; and an N×N dividing manner, in which an image block is divided into four image sub-blocks of a same size, as shown in FIG. 1d. N is any positive integer.

In addition, an asymmetrical dividing manner may also be applied to an image block, as shown in FIG. 2a to FIG. 2d. In dividing manners shown in FIG. 2a and FIG. 2b, one image block is divided into one upper rectangular image sub-block and one lower rectangular image sub-block of different sizes. In two image sub-blocks obtained through dividing in a 2N×nU dividing manner (where n=0.5 N) shown in FIG. 2a, the lengths of two sides of an upper image sub-block are 2N and 0.5N, and the lengths of two sides of a lower image sub-block are 2N and 1.5N. In 2N×nU, U indicates that an image dividing line shifts upward to a midnormal of the image block. 2N×nU indicates that the image dividing line shifts upward by n to the midnormal of the image block, where n=x*N and x is greater than or equal to 0 and smaller than or equal to 1; in two image sub-blocks obtained through dividing in a 2N×nD dividing manner (where n=0.5 N) shown in FIG. 2b, the lengths of two sides of an upper image sub-block are 2N and 1.5N, and the lengths of two sides of a lower image sub-block are 2N and 0.5N. In 2N×nD, D indicates that an image dividing line shifts downward to a midnormal of the image block. 2N×nD indicates that the image dividing line shifts downward by n to the midnormal of the image block, where n=x*N and x is greater than or equal to 0 and smaller than or equal to 1.

In dividing manners shown in FIG. 2c and FIG. 2d, one image block is divided into one left rectangular image sub-block and one right rectangular image sub-block of different sizes. In two image sub-blocks obtained through dividing in an nL×2N dividing manner (where n=0.5 N) shown in FIG. 2c, lengths of two sides of a left image sub-block are 0.5N and 2N. In nL×2N, L indicates that an image dividing line shifts leftward to a midnormal of the image block. nL×2N indicates that the image dividing line shifts leftward by n to the midnormal of the image block, where n=x*N and x is greater than or equal to 0 and smaller than or equal to 1. Lengths of two sides of a right image sub-block are 1.5N and 2N; in two image sub-blocks obtained through dividing in an nR×2N dividing manner (where n=0.5 N) shown in FIG. 2d, lengths of two sides of a left image sub-block are 1.5N and 2N, and lengths of two sides of a right image sub-block are 0.5N and 2N. In nR×2N, R indicates that an image dividing line shifts rightward to a midnormal of the image block. nR×2N indicates that the image dividing line shifts rightward by n to the midnormal of the image block, where n=x*N and x is greater than or equal to 0 and smaller than or equal to 1.

The preceding image block dividing manners may also be represented by using prediction block types. 2N×2N, 2N×N, N×2N, 2N×nU, 2N×nD, nL×2N, and nR×2N all represent prediction block types corresponding to the image block dividing manners.

Among the preceding image block dividing manners, a dividing manner of dividing an image block or a transform block by a horizontal dividing line into multiple image sub-blocks or transform blocks or prediction blocks that are arranged along a vertical direction is a horizontal dividing manner, and a dividing direction used in this case is a horizontal dividing direction. The 2N×N dividing manner, the 2N×nU dividing manner, and the 2N×nD dividing manner are collectively referred to as a horizontal dividing manner; while a dividing manner of dividing an image block or a transform block by a vertical dividing line into multiple image sub-blocks or transform blocks or prediction blocks that are arranged along a horizontal direction is a vertical dividing manner, and a dividing direction used in this case is a vertical dividing direction. The N×2N dividing manner, the nL×2N dividing manner, and the nR×2N dividing manner are collectively referred to as a vertical dividing manner; and a dividing manner of dividing an image block or a transform block by a horizontal dividing line and a vertical dividing line into four image sub-blocks or transform blocks or prediction blocks is a horizontal and vertical dividing manner, and a dividing direction used in this case is a horizontal and vertical dividing direction. The N×N dividing manner is a horizontal and vertical dividing manner.

In an existing video coding and decoding technology, a transform matrix may be used to remove correlation of a residual of an image block, that is, to remove redundant information of the image block, so as to improve coding efficiency. Generally, two-dimensional transform is used for transform of a data block in an image block. That is, the coding end multiplies residual information of the data block, one N×M transform matrix, and a transpose matrix of the N×M transform matrix to obtain a transform coefficient. The preceding step may be described by using the following formula:

$$f = T' \times C \times T$$

where C represents residual information of a data block, T and T' represent a transform matrix and a transpose matrix of the transform matrix, and f represents a transform coefficient matrix obtained after the residual information of the data block is transformed. The transform matrix may be a discrete cosine transform (DCT) matrix, an integer transform matrix, a KL transform (Karhunen Loeve Transform, KLT) matrix, or the like. KLT may better consider texture information of an image block or an image block residual, and therefore, using KLT may achieve a better effect.

Performing the preceding processing on the residual information of the image block is equivalent to transforming the residual information of the image block from a space domain to a frequency domain, and the transform coefficient matrix f obtained after the processing is concentrated in a low-frequency area. After performing the preceding transform on the residual information of the image block, the coding end performs processing such as quantification and entropy coding on the transform coefficient matrix obtained after the transform, and sends a bit stream obtained through the entropy coding to the decoding end. To enable the decoding end to learn a type and a size of a transform matrix used at the coding end, generally the coding end sends indication information that represents a transform matrix used by a current image block to the decoding end.

Subsequently, the decoding end determines, according to the indication information, the transform matrix used at the coding end; decodes, according to a characteristic (such as orthogonality of the transform matrix) of the transform matrix, the bit stream sent by the coding end to obtain the transform coefficient matrix; multiplies the transform coefficient matrix and the transform matrix and the transpose matrix of the transform matrix, to restore and obtain residual information of a data block that is approximately consistent with that of the coding end. The preceding step may be described by using the following formula:

$$C = T' \times f \times T$$

where C represents residual information of a data block, T and T' represent a transform matrix and a transpose matrix of the transform matrix, and f represents a transform coefficient matrix obtained by the decoding end.

Because different regularities of distribution may exist for a residual of an image block, a good transform effect often cannot be achieved by using a transform matrix of a specific size. Therefore, in the prior art, it is attempted to use transform matrices (also called transform blocks) of different sizes for the residual of the image block. For this reason, for a 2N×2N image block, a transform matrix whose size is 2N×2N may be used, or transform matrices whose sizes are N×N or transform matrices whose sizes are 0.5N×0.5N may be used. To effectively represent how transform matrices of different sizes are used for an image block, a tree identification method may be used.

As shown in FIG. 3, when a transform size used by an image block is identified, a first layer of a code steam has an indicator bit used to identify whether the image block uses a transform matrix whose size is 2N×2N. If the image block uses the transform matrix whose size is 2N×2N (as shown in FIG. 3a), the indicator bit is 0. If the image block does not use 2N×2N transform, the indicator bit is 1, indicating that the transform matrix whose size is 2N×2N needs to be further divided into four transform matrices whose sizes are N×N, and four bits are used in a second-layer structure of the code stream to respectively identify whether to further divide each transform matrix whose size is N×N. When the image block uses a transform structure shown in FIG. 3b, all the four bits are 0, indicating that each transform matrix whose size is N×N is not further divided.

When a transform structure shown in FIG. 3c is used, two of the four bits are 0 and the rest two bits are 1. The two bits being 0 indicate that a lower left transform matrix and an upper right transform matrix whose sizes are N×N are not further divided. The rest two bits being 1 indicate that an upper left transform matrix and a lower right transform matrix whose sizes are N×N need to be further divided to obtain transform matrices whose sizes are 0.5N×0.5N. Then, in a third-layer structure of the code stream, four bits are used to indicate whether upper left transform matrices whose sizes are 0.5N×0.5N need to be further divided; and four bits are used to indicate whether lower right transform matrices whose sizes are 0.5N×0.5N need to be further divided. If the image block uses the transform structure shown in FIG. 3c, all the 4+4 bits are 0, indicating that further dividing is not performed. The layer-by-layer identification in the code stream may effectively and flexibly represent transform sizes used by the image block and the image sub-blocks.

In the preceding method of using layer-by-layer identification in the prior art, a size of a transform matrix is not correlated to a size of a prediction block. As shown in FIG. 4a, when a 2N×2N image block uses asymmetrical dividing (a dividing line is indicated by a heavy solid line shown in the figure), if the current image block uses a transform matrix whose size is 2N×2N, the transform matrix crosses a boundary of a prediction block; if the current image block uses four transform matrices whose sizes are N×N, the transform matrices still cross the boundary of the prediction block; if the lower left and upper right of the current image block use transform matrices whose sizes are N×N and the upper left and lower right of the current image block use transform matrices whose sizes are 0.5N×0.5N, a lower left transform matrix whose size is N×N of the current image block still crosses the boundary of the prediction block.

The prior art has the following disadvantages:

In the prior art, a size of a transform matrix is not correlated to a size of a prediction block, and as a result, the transform matrix crosses a boundary of the prediction block. Abrupt transform may exist for residual data corresponding to boundaries of two prediction blocks. Therefore, if a transform matrix crosses the boundaries of the two prediction blocks, a transform effect is weakened; correlation of a residual of an image block cannot be effectively removed; redundant information of the image block cannot be effectively removed; and coding efficiency is lowered.

SUMMARY

The present disclosure provides a method for obtaining a size of a transform block, where the method includes: obtaining a dividing manner of an image block; and obtaining size information of a post-dividing transform block according to the dividing manner of the image block and a width and a height of a pre-dividing transform block.

The present disclosure further provides another method for obtaining a size of a transform block, where the method includes: obtaining a height and a width of a pre-dividing transform block; and obtaining size information of a post-dividing transform block according to the height of the pre-dividing transform block, the width of the pre-dividing transform block, and a preset maximum transform block size or a preset minimum transform block size.

Accordingly, the present disclosure further provides a module configured to execute the preceding methods.

By using the methods and the module for obtaining a size of a transform block provided in the present disclosure, a size of a transform block may be coded according to a dividing manner of an image block or a height and a width of a pre-dividing transform block, thereby effectively improving coding efficiency.

BRIEF DESCRIPTION OF DRAWINGS

To illustrate the technical solutions in the embodiments of the present disclosure more clearly, the following briefly introduces accompanying drawings required for describing the embodiments. Apparently, the accompanying drawings in the following description show merely some embodiments of the present disclosure, and a person of ordinary skill in the art may still derive other drawings according to these accompanying drawings without creative efforts.

DESCRIPTION OF EMBODIMENTS

Embodiment 1

Figure 1A:
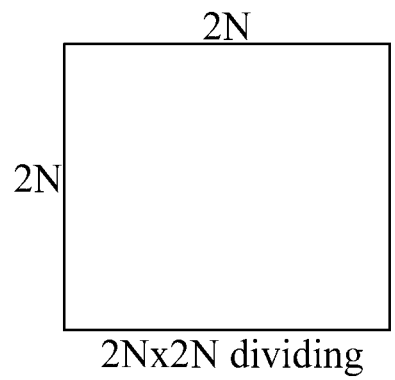
FIG. 1a is a schematic diagram of a dividing manner 2N×2N.
Figure 1B:
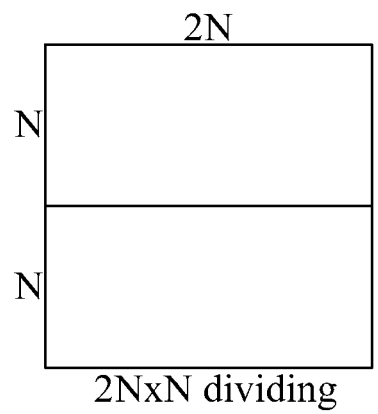
FIG. 1b is a schematic diagram of a dividing manner 2N×N.
Figure 1C:
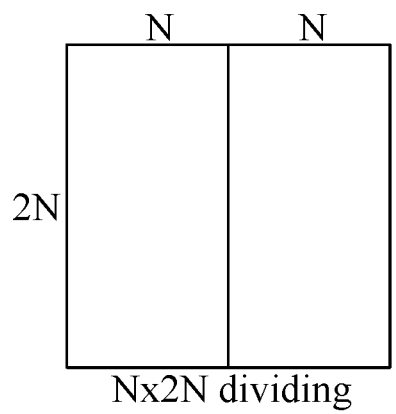
FIG. 1c is a schematic diagram of a dividing manner N×2N.
Figure 1D:
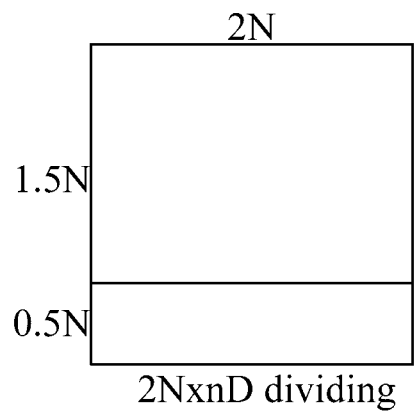
FIG. 1d is a schematic diagram of a dividing manner N×N.
Figure 2A:
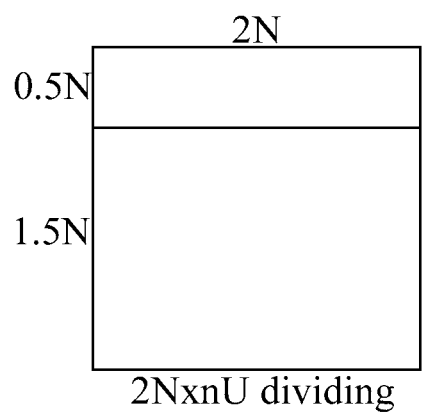
FIG. 2a is a schematic diagram of a dividing manner 2N×nU.
Figure 2B:
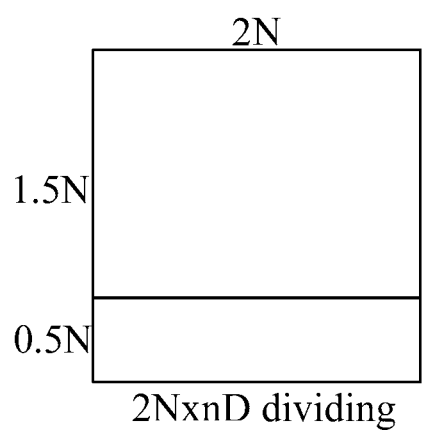
FIG. 2b is a schematic diagram of a dividing manner 2N×nD.
Figure 2C:
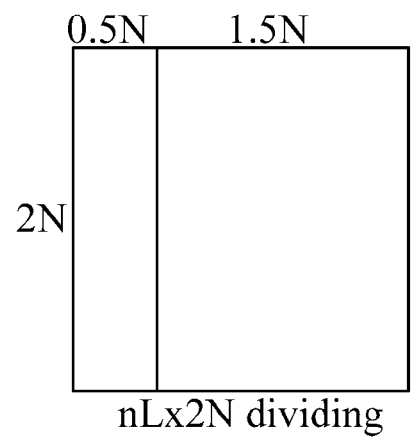
FIG. 2c is a schematic diagram of a dividing manner nL×2N.
Figure 2D:
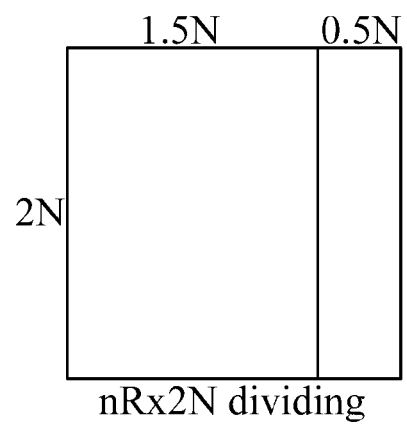
FIG. 2d is a schematic diagram of a dividing manner nR×2N.
Figure 3A:
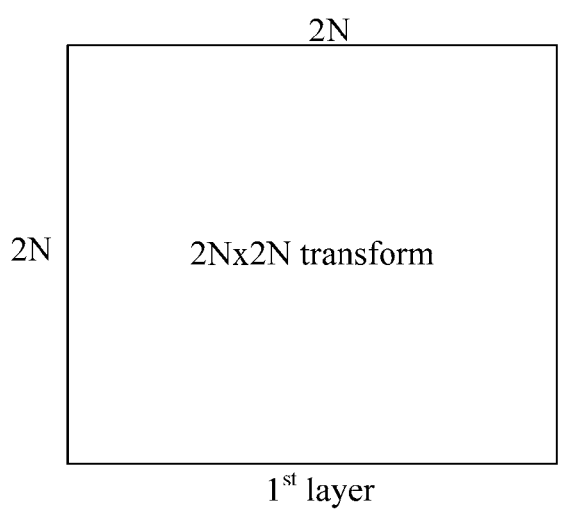
FIG. 3a is a schematic diagram of applying a transform block whose size is 2N×2N to an image block.
Figure 3B:
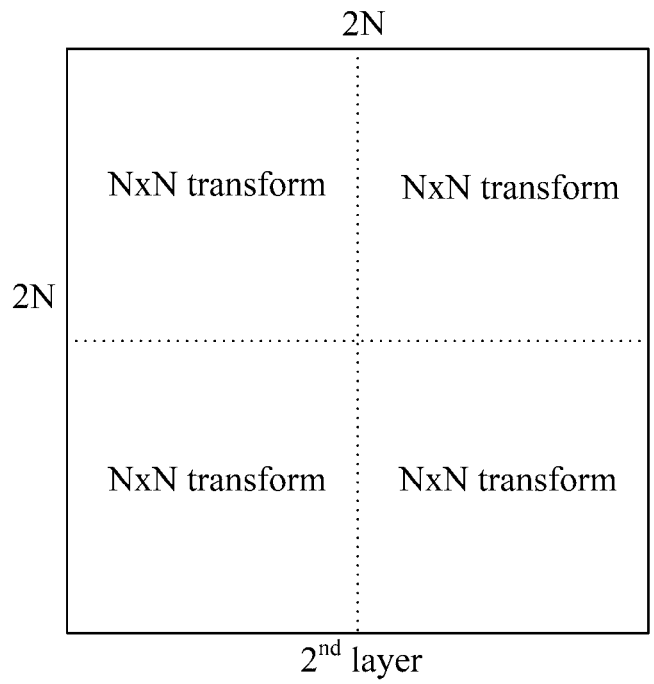
FIG. 3b is a schematic diagram of applying four transform blocks whose sizes are N×N to an image block.
Figure 3C:
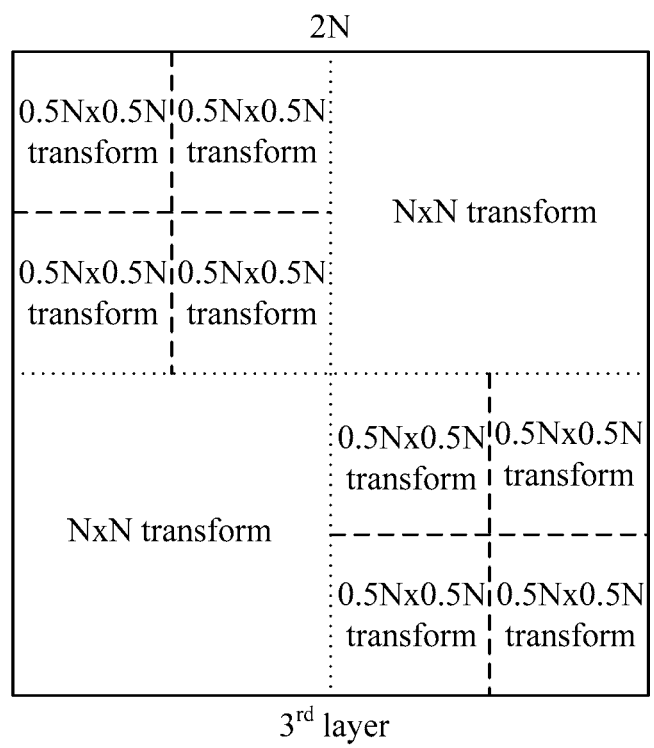
FIG. 3c is a schematic diagram of applying transform blocks whose sizes are N×N and transform blocks whose sizes are 0.5N×0.5N to an image block.
Figure 4A:
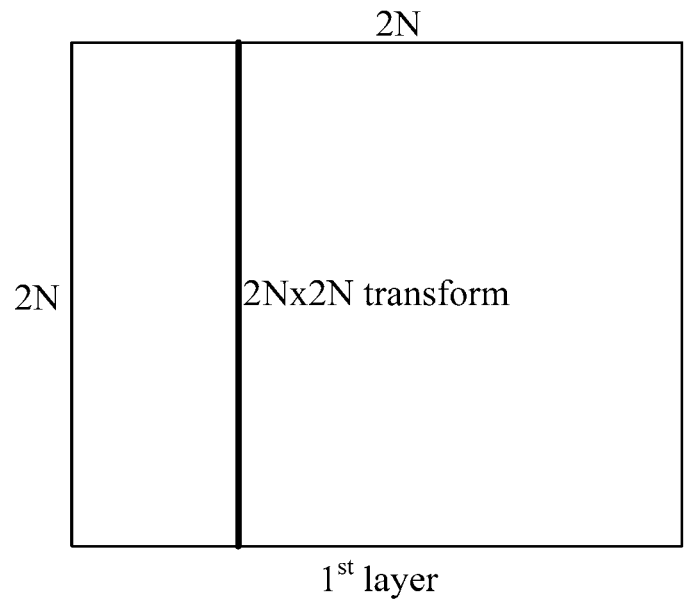
FIG. 4a is a schematic diagram of applying a transform block whose size is 2N×2N to an image block in an asymmetrical dividing case.
Figure 4B:
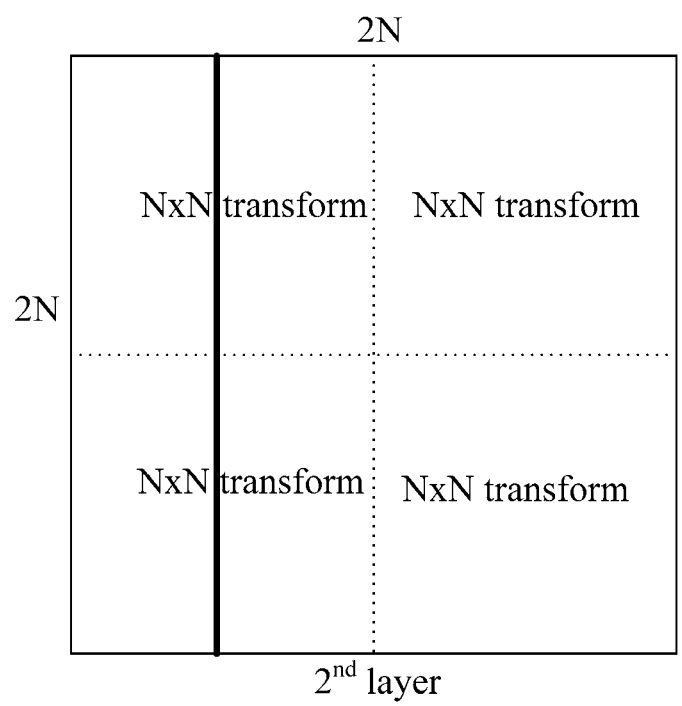
FIG. 4b is a schematic diagram of applying four transform blocks whose sizes are N×N to an image block in an asymmetrical dividing case.
Figure 4C:
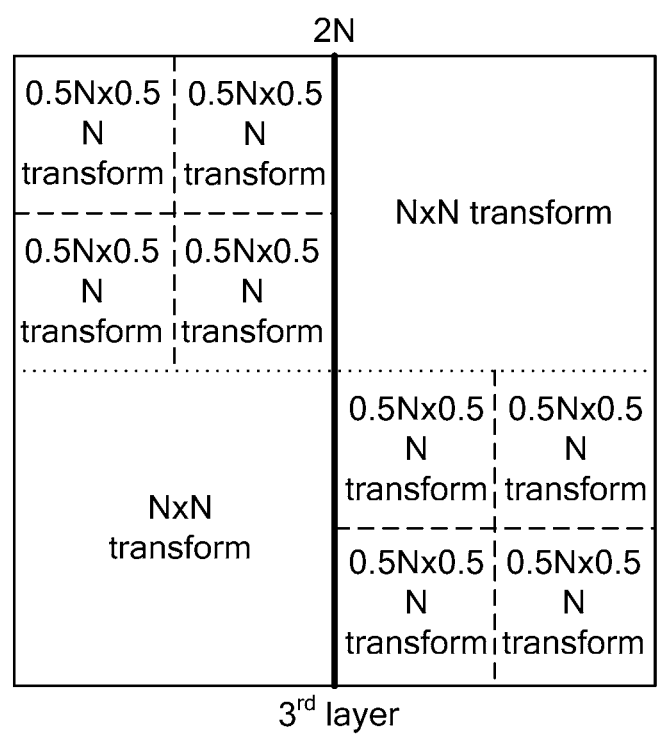
FIG. 4c is a schematic diagram of applying transform blocks whose sizes are N×N and transform blocks whose sizes are 0.5N×0.5N to an image block in an asymmetrical dividing case.
Figure 5:
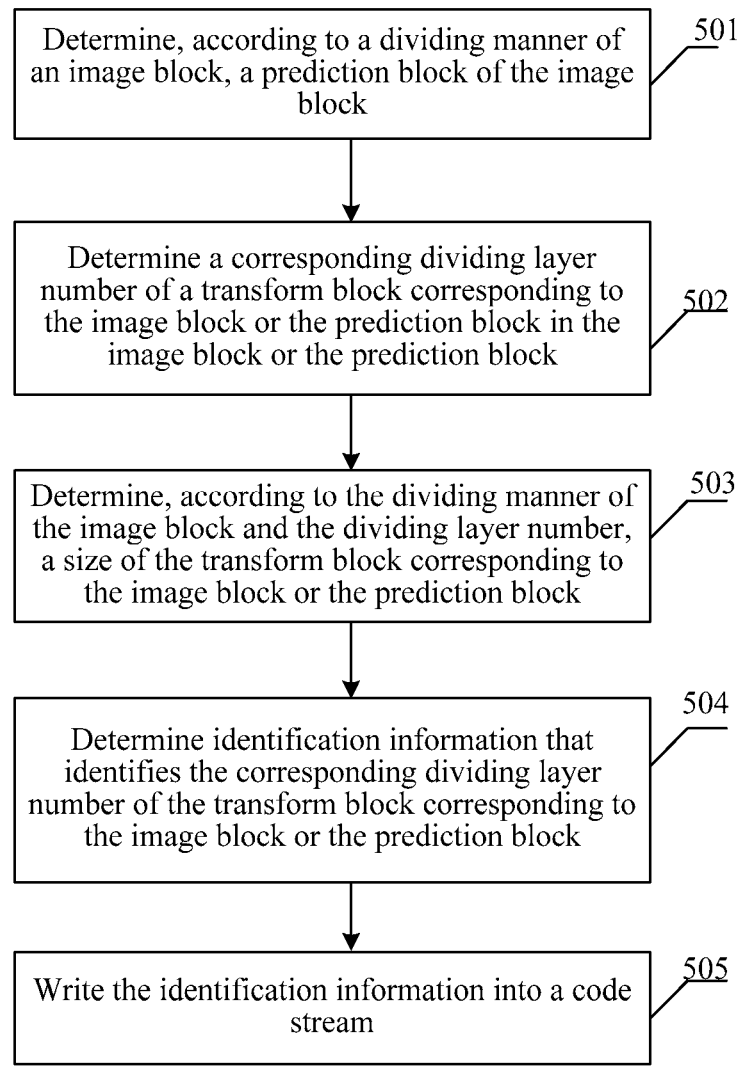
FIG. 5 is a flowchart of a method for coding an image according to Embodiment 1 of the present disclosure.

Referring to FIG. 5, this embodiment of the present disclosure provides a method for coding an image. The method specifically includes:

501: Determine, according to a dividing manner of an image block, a prediction block used by the image block.

In this embodiment, each step may be executed by a device for coding an image.

Dividing manners of an image block may be classified into an nL×2N dividing manner and a 2N×nL dividing manner. The nL×2N dividing manner belongs to vertical dividing, for example, the image block is divided into a 0.5N×2N image sub-block and a 1.5N×2N image sub-block; and the 2N×nL dividing manner belongs to horizontal dividing, for example, the image block is divided into a 2N×0.5N image sub-block and a 2N×1.5N image sub-block. In this step, the determining, according to a dividing manner of an image block, a prediction block used by the image block specifically includes: determining, according to the dividing manner of the image block, a size of the prediction block used by the image block, where the size of the prediction block is the same as a size of an image sub-block obtained through dividing.

502: Determine a corresponding dividing layer number of a transform block corresponding to the image block or the prediction block in the image block or the prediction block, where the transform block corresponding to the image block or the prediction block includes one or more transform blocks.

In each embodiment of the present disclosure, the transform block corresponding to the image block is a transform block used by the image block; and the transform block corresponding to the prediction block is a transform block used by an image sub-block that matches the size of the prediction block. The corresponding dividing layer number of the transform block corresponding to the image block or the prediction block in the image block or the prediction block is a dividing layer number used by the transform block corresponding to the image block or the prediction block in the image block or the prediction block.

503: Determine, according to the dividing manner of the image block and the dividing layer number, a size of the transform block corresponding to the image block or the prediction block. The dividing layer number is the corresponding dividing layer number of the transform block corresponding to the image block or the prediction block.

When a corresponding dividing layer number of at least one transform block corresponding to the image block (or the prediction block) in the image block (or the prediction block) is an $(N+1)^{th}$ dividing layer, a horizontal size of the at least one transform block is smaller than a horizontal size of a transform block corresponding to an $N^{th}$ dividing layer; and/or a vertical size of the at least one transform block is smaller than a vertical size of the transform block corresponding to the $N^{th}$ dividing layer.

The horizontal size of the at least one transform block is smaller than the horizontal size of the transform block corresponding to the $N^{th}$ dividing layer, which is specifically as follows: The horizontal size of the at least one transform block is $1/m_1$ of the horizontal size of the transform block corresponding to the $N^{th}$ dividing layer, where $m_1$ is greater than or equal to 2; and the vertical size of the at least one transform block is smaller than the vertical size of the transform block corresponding to the $N^{th}$ dividing layer, which is specifically as follows: The vertical size of the at least one transform block is $1/m_2$ of the vertical size of the transform block corresponding to the $N^{th}$ dividing layer, where $m_2$ is greater than or equal to 2. $m_1$ and $m_2$ may be equal, and may also be unequal.

504: Determine identification information that identifies the corresponding dividing layer number of the transform block corresponding to the image block or the prediction block.

Specifically, when a corresponding dividing layer number of one transform block corresponding to the image block or the prediction block in the image block or the prediction block is a $1^{st}$ dividing layer, identification information that identifies the corresponding dividing layer number of the transform block corresponding to the image block or the prediction block includes: a flag bit indicating that a transform block in the $1^{st}$ dividing layer is not further divided; when a corresponding dividing layer number of one transform block corresponding to the image block or the prediction block in the image block or the prediction block is a $2^{nd}$ dividing layer, identification information that identifies the corresponding dividing layer number of the transform block corresponding to the image block or the prediction block includes: a flag bit indicating that a transform block in a $1^{st}$ dividing layer is further divided, where the transform block corresponding to the image block or the prediction block is a transform block obtained through further dividing the transform block in the $1^{st}$ dividing layer; when a corresponding dividing layer number of one transform block corresponding to the image block or the prediction block in the image block or the prediction block is a $3^{rd}$ dividing layer, identification information that identifies the corresponding dividing layer number of the transform block corresponding to the image block or the prediction block includes: a flag bit indicating that a transform block in a $1^{st}$ dividing layer is further divided and a flag bit indicating that a transform block in a $2^{nd}$ dividing layer is further divided, where the transform block corresponding to the image block or the prediction block is a transform block obtained through further dividing the transform block in the $2^{nd}$ dividing layer, and the transform block in the $2^{nd}$ dividing layer is a transform block obtained through further dividing the transform block in the $1^{st}$ dividing layer.

505: Write the identification information into a code stream.

Alternatively, in one implementation manner:

Step 502 may be determining a corresponding dividing layer number of a transform block corresponding to the prediction block in the prediction block. Step 503 may be determining, according to the dividing manner of the image block and the determined dividing layer number, a size of the transform block corresponding to the prediction block, and for a specific implementation manner of this step, reference may be made to detailed description of an embodiment shown in FIG. 6 subsequently, and details are not repeatedly described herein. It should be noted that, when the determined corresponding dividing layer number of the transform block corresponding to the prediction block in the prediction block is the $1^{st}$ dividing layer, the size of the transform block is a size of a smallest prediction block. Step 504 may be determining identification information that identifies the corresponding dividing layer number of the transform block corresponding to the prediction block; and step 505 may be writing the identification information that identifies the corresponding dividing layer number of the transform block corresponding to the prediction block into a code stream. When a corresponding dividing layer number of at least one transform block corresponding to the prediction block in the prediction block is the $N^{th}$ dividing layer, the determined identification information that identifies the corresponding dividing layer number of the at least one transform block corresponding to the prediction block includes: a flag bit indicating that the at least one transform block corresponding to the $N^{th}$ dividing layer is not further divided; when a corresponding dividing layer number of at least one transform block corresponding to the prediction block in the prediction block is greater than the $N^{th}$ dividing layer, the determined identification information that identifies the corresponding dividing layer number of the at least one transform block corresponding to the prediction block includes: a flag bit indicating that a transform block corresponding to the $N^{th}$ dividing layer is further divided, where the transform block corresponding to the $N^{th}$ dividing layer is an upper-layer transform block of the at least one transform block, and N is an integer greater than 1, and for example, may be 1, 2, 3, 4, 5, or the like. When the corresponding dividing layer number of the transform block corresponding to the prediction block in the prediction block is a specific dividing layer, the size which is of the transform block and is determined according to the dividing manner of the image block and the specific dividing layer is the size of the smallest prediction block, where the smallest prediction block is a prediction block of a minimum size among prediction blocks determined for the image block. The specific dividing layer may be the $1^{st}$ dividing layer.

Alternatively, in another implementation manner:

Step 502 may be determining a corresponding dividing layer number of a transform block corresponding to the image block in the image block. Step 503 may be determining, according to the dividing manner of the image block and the determined dividing layer number, a size of the transform block corresponding to the image block, and for a specific implementation manner of this step, reference may be made to detailed description of an embodiment shown in FIG. 7 subsequently, and details are not repeatedly described herein.

It should be noted that, when the determined corresponding dividing layer number of the transform block corresponding to the image block in the image block is the $1^{st}$ dividing layer, the size which is of the transform block and is determined according to the dividing manner of the image block and the determined dividing layer number is a size of the image block; when the determined corresponding dividing layer number of the transform block corresponding to the image block in the image block is the $2^{nd}$ dividing layer, the size which is of the transform block and is determined according to the dividing manner of the image block and the determined dividing layer number is a size of a smallest prediction block.

Step 504 may be determining identification information that identifies the corresponding dividing layer number of the transform block corresponding to the image block; and step 505 may be writing the identification information that identifies the corresponding dividing layer number of the transform block corresponding to the image block into a code stream. When a corresponding dividing layer number of at least one transform block corresponding to the image block in the image block is the $N^{th}$ dividing layer, the determined identification information that identifies the corresponding dividing layer number of the at least one transform block corresponding to the image block includes: a flag bit indicating that the at least one transform block of the $N^{th}$ dividing layer is not further divided; when a corresponding dividing layer number of at least one transform block corresponding to the image block in the image block is greater than the $N^{th}$ dividing layer, the determined identification information that identifies the corresponding dividing layer number of the at least one transform block corresponding to the image block includes: a flag bit indicating that a transform block corresponding to the $N^{th}$ dividing layer is further divided, where N is an integer greater than 1, and for example, may be 1, 2, 3, 4, 5, or the like. The transform block corresponding to the $N^{th}$ dividing layer is an upper-layer transform block of the at least one transform block.

When the corresponding dividing layer number of the transform block corresponding to the image block in the image block is a $1^{st}$ specific dividing layer, the size which is of the transform block and is determined according to the dividing manner of the image block and the $1^{st}$ specific dividing layer is the size of the image block; when the corresponding dividing layer number of the transform block corresponding to the image block in the image block is a $2^{nd}$ specific dividing layer, the size which is of the transform block and is determined according to the dividing manner of the image block and the $2^{nd}$ specific dividing layer is the size of the smallest prediction block, where the smallest prediction block is a prediction block of a minimum size among prediction blocks determined for the image block. The $2^{nd}$ specific dividing layer is a lower dividing layer of the $1^{st}$ specific dividing layer, the $1^{st}$ specific dividing layer may be the $1^{st}$ dividing layer, and the $2^{nd}$ specific dividing layer may be the $2^{nd}$ dividing layer.

The smallest prediction block is a prediction block of a minimum size among the determined prediction blocks used by the image block. That is, the smallest prediction block is a prediction block of a minimum horizontal size and/or a minimum vertical size among the prediction blocks used by the image block.

In this embodiment of the present disclosure, during determination of a size of a transform block, a dividing manner of an image block is considered, and identification information that identifies a corresponding dividing layer number of a transform block corresponding to the image block or a prediction block is written into a code stream, so that the size of the transform block is identified by using a layer-by-layer identification method. This ensures that the transform block does not cross a boundary of the prediction block while the size of the transform block is effectively identified, thereby effectively improving coding efficiency.

Embodiment 2

Figure 6:
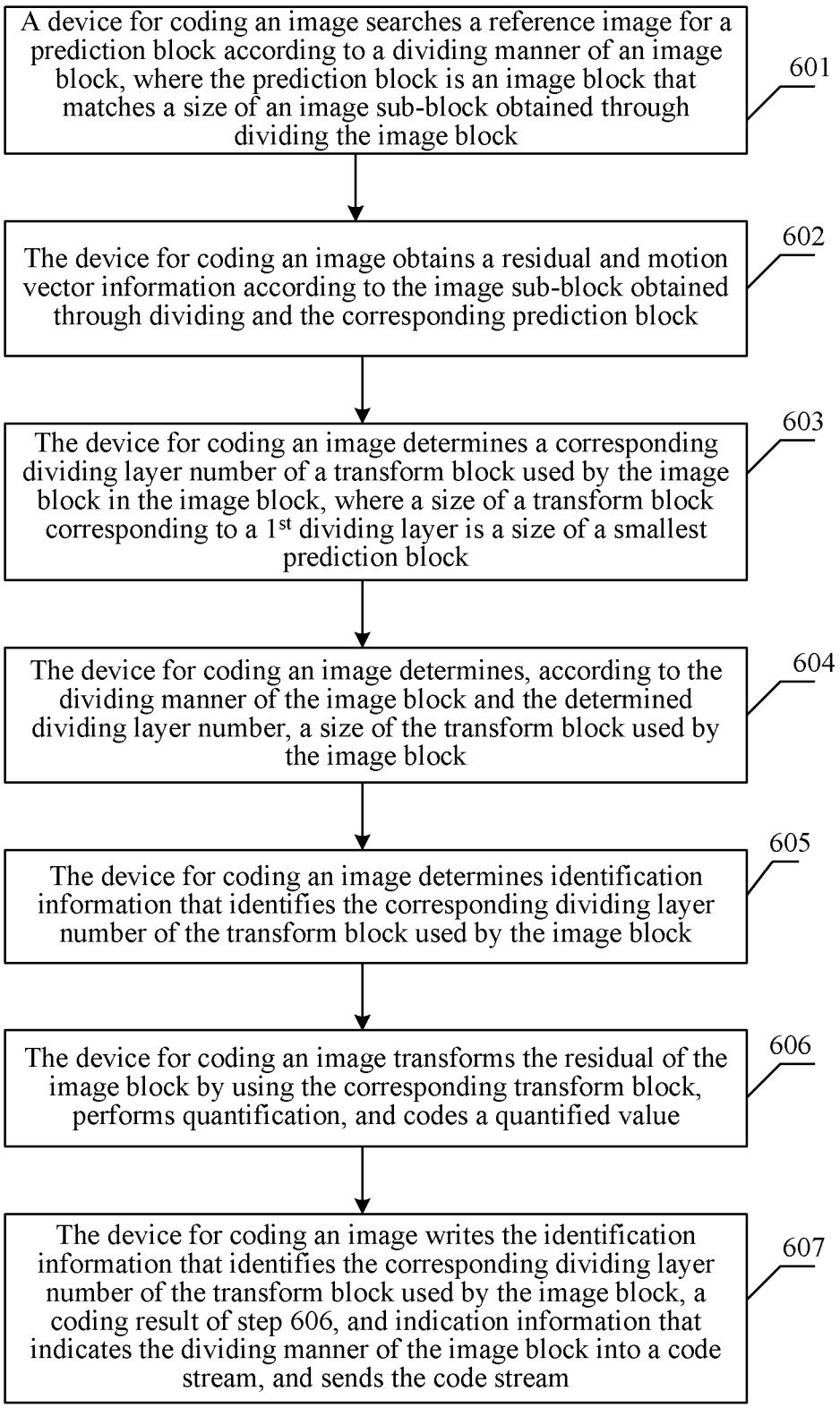
FIG. 6 is a flowchart of a method for coding an image according to Embodiment 2 of the present disclosure.

To make the foregoing technical solutions provided by the present disclosure more comprehensible, the following two embodiments introduce the foregoing technical solutions of the present disclosure in detail:

Referring to FIG. 6, this embodiment of the present disclosure provides a method for coding an image. In the method, a dividing layer where a transform block used by an image block is located and a specific size of the transform block used by the image block are determined. The method specifically includes:

601: A device for coding an image searches a reference image for a prediction block according to a dividing manner of an image block, where the prediction block is an image block that matches a size of an image sub-block obtained through dividing the image block.

In each embodiment of the present disclosure, size matching may mean that sizes are the same or a size difference is within a predetermined range.

602: The device for coding an image obtains a residual and motion vector information according to the image sub-block obtained through dividing and the corresponding prediction block.

The residual is a difference between a pixel value of a pixel point of the image sub-block obtained through dividing and a pixel value of a corresponding pixel point of the prediction block, such as a difference between a brightness value of a pixel point of the image sub-block obtained through dividing and a brightness value of a corresponding pixel point of the prediction block, or a difference between a chromatic value of a pixel point of the image sub-block obtained through dividing and a chromatic value of a corresponding pixel point of the prediction block. The motion vector information indicates a position difference between the image sub-block obtained through dividing and the prediction block.

603: The device for coding an image determines a corresponding dividing layer number of the transform block used by the image block in the image block. A size of a transform block corresponding to a $1^{st}$ dividing layer is a size of a smallest prediction block.

In a method for coding a video, when multiple implementation methods exist for the device for coding an image, generally an optimal coding manner is obtained by using a traversal method. That is, in each embodiment of the present disclosure for describing image coding, the device for coding an image may traverse various dividing layer numbers available for use, to determine which dividing layer number can achieve a best transform effect. A size of a transform block corresponding to a $1^{st}$ dividing layer is a size of a smallest prediction block.

604: The device for coding an image determines, according to the dividing manner of the image block and the determined dividing layer number, a size of the transform block used by the image block.

Figure 6A:
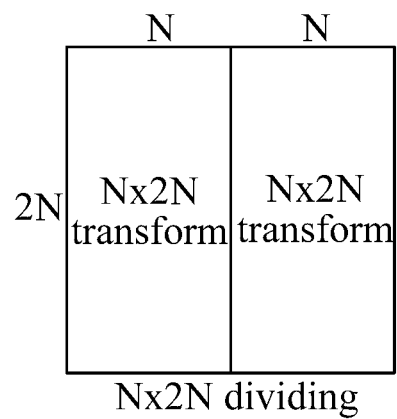
FIG. 6a is a schematic diagram of applying transform blocks whose sizes are N×2N to an image block.

For example, when the dividing manner corresponding to the image block is N×2N dividing, the image block is divided into two image sub-blocks whose sizes are N×2N, and in this case, a size of a prediction block is N×2N. In this case, as shown in FIG. 6a, if it is determined in step 603 that a very good transform effect can be achieved by applying the $1^{st}$ dividing layer to the image block, a transform size corresponding to the $1^{st}$ dividing layer is determined as N×2N according to the dividing manner of the image block in a method for identifying a transform size layer by layer. That is, the image block is divided into two N×2N data blocks, and each block separately uses an N×2N transform block. As shown in FIG. 6c, when a second data block whose size is N×2N of the image block needs to use transform blocks obtained through further dividing, that is, when transform blocks of a $2^{nd}$ dividing layer need to be used, a size of a transform block obtained through further dividing the N×2N transform block, that is, a size of a transform block which is of the $2^{nd}$ dividing layer and is obtained through further dividing a transform block (that is, a transform block whose size is N×2N) of the $1^{st}$ dividing layer, is determined according to the dividing manner of the image block and the dividing layer number. In this case, a horizontal size corresponding to a lower-layer transform block is the same as a horizontal size of a transform block corresponding to a current layer, and a vertical size corresponding to the lower-layer transform block is half of a vertical size of the transform block corresponding to the current layer. That is, in this case, the size of the transform block is N×N, the lower-layer transform block belongs to the $2^{nd}$ dividing layer, and the current layer is the $1^{st}$ dividing layer.

Figure 6B:
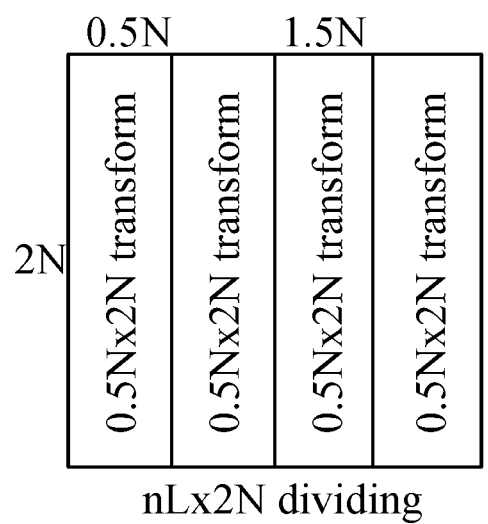
FIG. 6b is a schematic diagram of applying transform blocks whose sizes are 0.5N×2N to an image block.
Figure 6C:
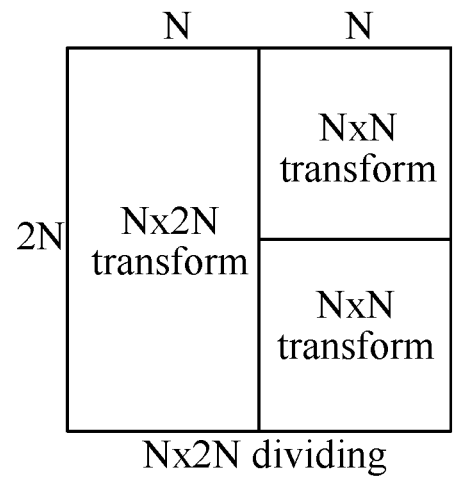
FIG. 6c is a schematic diagram of applying a transform block whose size is N×2N and transform blocks whose sizes are N×N to an image block.
Figure 6D:
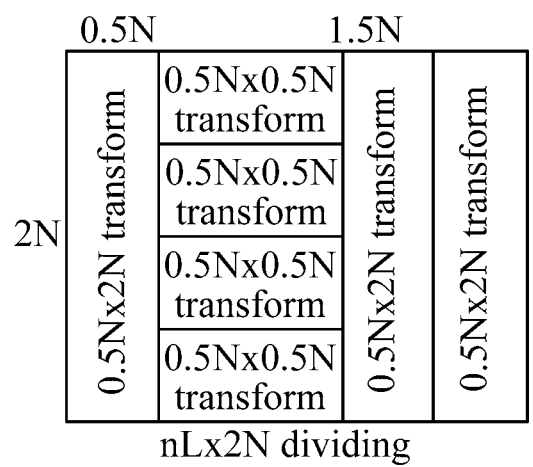
FIG. 6d is a schematic diagram of applying transform blocks whose sizes are 0.5N×2N and transform blocks whose sizes are 0.5N×0.5N to an image block.

For another example, as shown in FIG. 6b, when the dividing manner used by the image block is nL×2N dividing, assuming that the image block is divided into two image sub-blocks whose sizes are 0.5N×2N and 1.5N×2N respectively, in this case, sizes of prediction blocks corresponding to the two image sub-blocks are 0.5N×2N and 1.5N×2N respectively. In this case, if it is determined that a very good transform effect can be achieved by applying a transform block of the $1^{st}$ dividing layer to the image block, a transform size corresponding to the $1^{st}$ dividing layer is determined, according to the dividing manner of the image block in a method for identifying a transform size layer by layer, to be consistent with the size of the smallest prediction block among prediction blocks. That is, the size of the transform block is 0.5N×2N, namely, the image block is divided into four 0.5N×2N data blocks, and each data block separately uses 0.5N×2N transform. A transform structure used in the nL×2N dividing manner is consistent with that of nL×2N. In this case, it may be ensured that a transform size does not exceed a prediction block. That is, the transform does not cross a boundary of the prediction block, thereby ensuring transform efficiency. If it is determined that a very good transform effect can be achieved by applying a transform block of the $1^{st}$ dividing layer to the image block, and as shown in FIG. 6d, when a second data block whose size is 0.5N×2N of the image block needs to use transform blocks obtained through further dividing, that is, when transform blocks of the $2^{nd}$ dividing layer need to be used, a size of a transform block obtained through further dividing the 0.5N×2N transform block, that is, a size of a transform block of the $2^{nd}$ dividing layer obtained through further dividing a transform block (that is, a transform block whose size is 0.5N×2N) of the 1st dividing layer, is determined according to the dividing manner of the image block and the dividing layer number. In this case, a horizontal size corresponding to a lower-layer transform block is the same as a horizontal size of a transform block corresponding to a current layer, and a vertical size corresponding to the lower-layer transform block is half of a vertical size of the transform block corresponding to the current layer. That is, in this case, the size of the transform block is 0.5N×0.5N, the lower-layer transform block belongs to the $2^{nd}$ dividing layer, and the current layer is the $1^{st}$ dividing layer. Other data blocks that do not use a transform block obtained through further dividing still use 0.5N×2N transform.

When the image block is divided into two or more image sub-blocks along a horizontal direction by using a horizontal dividing manner, such as 2N×N, 2N×nU, 2N×nD, N×2N, or nR×N, a manner of determining a transform structure used by the image block is the same as that described in the foregoing.

In the preceding coding process, a dividing layer number allowed in a certain dividing manner may be predetermined, or a minimum transform size allowed in a certain dividing manner may be predetermined. The dividing layer number allowed in a certain dividing manner is the maximum number of dividing layers available for use in the dividing manner, and the maximum number of dividing layers available for use may be preset in a coding and decoding system. For example, the device for coding an image and a device for decoding an image preset that at most two layers of dividing may be used; or the device for coding an image may also write indication information that identifies the maximum number of dividing layers available for use into a code stream, so as to notify a device for decoding an image of the maximum number of dividing layers available for use. The minimum transform size allowed in a certain dividing manner is a transform block size corresponding to a maximum dividing layer number allowed in the dividing manner. That is, a minimum transform block size is set in the device for coding an image and the device for decoding an image. For example, a minimum transform block size allowed in the N×2N image block dividing manner is preset to N×N in the device for coding an image and the device for decoding an image, and a minimum transform block size allowed in the nL×2N image block dividing manner is preset to 0.5N×0.5N; or the device for coding an image writes indication information that identifies a minimum transform block size available for use into a code stream, so as to notify the device for decoding an image of the minimum transform block size available for use, for example, the device for coding an image writes indication information indicating that a minimum transform block size allowed in the N×2N image block dividing manner is N×N into a code stream, or writes indication information indicating that a minimum transform block size allowed in the nL×2N image block dividing manner is 0.5N×0.5N into a code stream.

605: The device for coding an image determines identification information that identifies the corresponding dividing layer number of the transform block used by the image block.

Specifically, as shown in FIG. 6a, the determined identification information that identifies the corresponding dividing layer number of the transform block corresponding to the image block includes: two bits, where values of both the two bits are a first specific value, such as 1, used to indicate that N×2N transform blocks corresponding to the $1^{st}$ dividing layer are not further divided. As shown in FIG. 6c, the determined identification information that identifies the corresponding dividing layer number of the transform block corresponding to the image block includes: two bits, where a value of a bit corresponding to a left N×2N block is a first specific value, such as 1, used to indicate that an N×2N transform block corresponding to the $1^{st}$ dividing layer is not further divided; and a value of a bit corresponding to a right N×2N block is a second specific value, such as 0, used to indicate that an N×2N transform block corresponding to the $1^{st}$ dividing layer needs to be further divided.

Specifically, as shown in FIG. 6b, the determined identification information that identifies the corresponding dividing layer number of the transform block corresponding to the image block includes: four bits, where values of all the bits are a first specific value, such as 1, used to indicate that 0.5N×2N transform blocks corresponding to the $1^{st}$ dividing layer are not further divided. As shown in FIG. 6d, the determined identification information that identifies the corresponding dividing layer number of the transform block corresponding to the image block includes: four bits, where values of bits corresponding to a first, a third, and a fourth 0.5N×2N transform blocks are a first specific value, such as 1, used to indicate that the three 0.5N×2N transform blocks are not further divided; and a value of a bit corresponding to a second 0.5N×2N transform block is a second specific value, such as 0, used to indicate that the 0.5N×2N transform block needs to be further divided.

606: The device for coding an image transforms the residual of the image block by using the corresponding transform block, performs quantification, and codes a quantified value.

607: The device for coding an image writes the identification information that identifies the corresponding dividing layer number of the transform block corresponding to the prediction block, a coding result of step 606, and indication information that indicates the dividing manner of the image block into a code stream, and sends the code stream.

In the foregoing embodiment of the present disclosure, during determination of a size of a transform block used by an image block, a dividing manner of the image block is considered, and identification information that identifies a dividing layer number where the transform block used by the image block is located is written into a code stream, so that the size of the transform block is identified by using a layer-by-layer identification method. This ensures that the transform block does not cross a boundary of a prediction block while the size of the transform block is effectively identified, thereby effectively improving coding efficiency.

Embodiment 3

Figure 7:
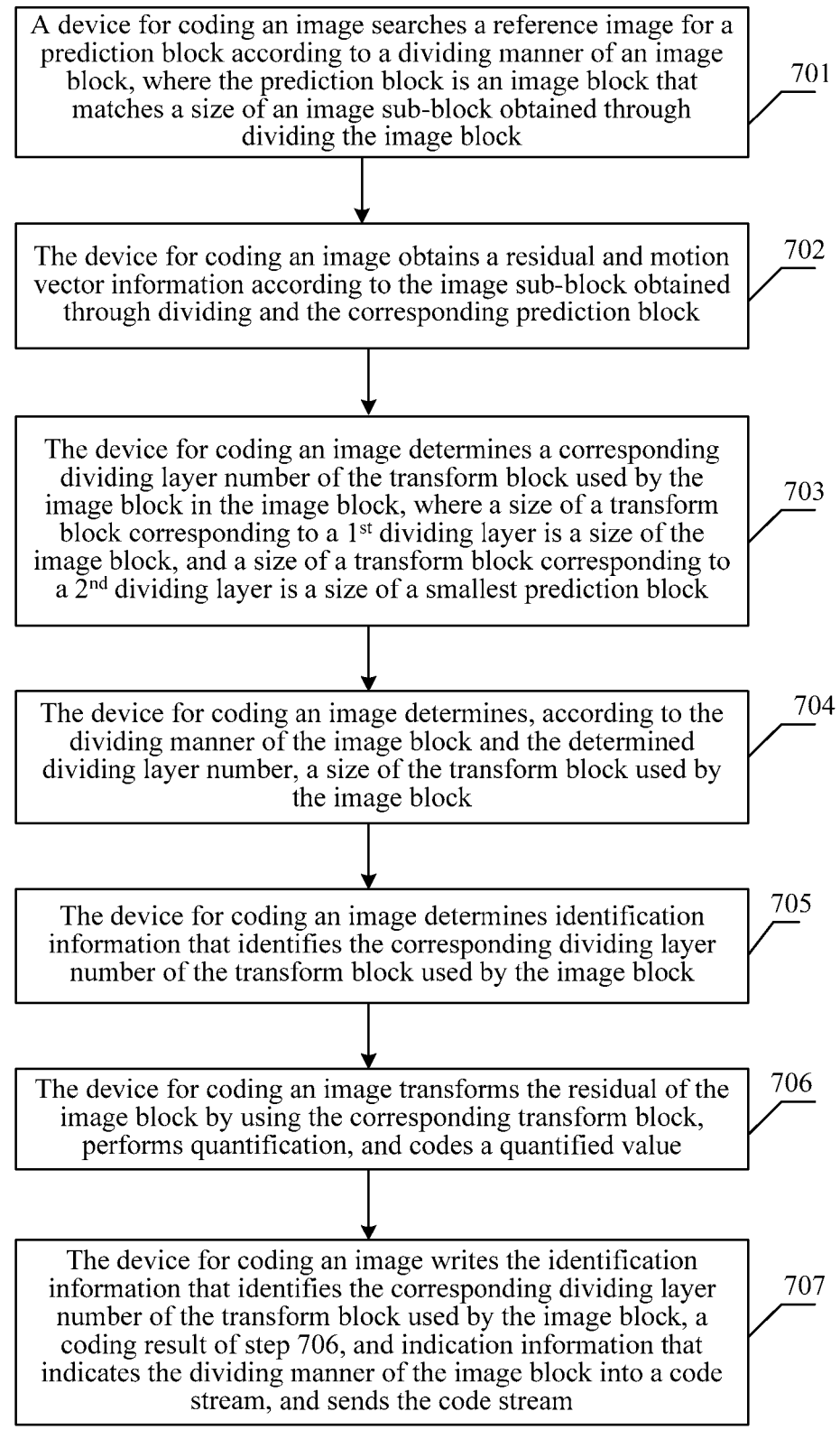
FIG. 7 is a flowchart of a method for coding an image according to Embodiment 3 of the present disclosure.

Referring to FIG. 7, this embodiment of the present disclosure provides another method for coding an image. In this embodiment, when a residual value that is obtained during prediction of two image sub-blocks obtained through dividing an image block is relatively small, a leap phenomenon of boundaries of the two image sub-blocks is not obvious, and in this case, that a transform block used by the image block crosses a boundary of an image sub-block also does not obviously cause transform efficiency to decrease. In addition, the number of coding bits required for identifying transform of a greater size is smaller than that required for identifying transform of a smaller size. Therefore, applying the transform of a greater size to the image block may achieve a better effect. In this embodiment, the transform of a greater size and the transform of a smaller size are combined by using a layer-by-layer identification method. This embodiment specifically includes:

Steps 701 to 702 are the same as steps 601 to 602, and details are not repeatedly described herein.

703: The device for coding an image determines a corresponding dividing layer number of the transform block used by the image block in the image block.

A specific implementation manner of this step is similar to that of step 603, except that: a size of a transform block corresponding to a $1^{st}$ dividing layer is a size of the image block, that is, 2N×2N; and a size of a transform block corresponding to a $2^{nd}$ dividing layer is a size of a smallest prediction block.

704: The device for coding an image determines, according to the dividing manner of the image block and the determined dividing layer number, a size of the transform block used by the image block.

Specifically, the determining, according to the dividing manner of the image block and the determined dividing layer number, a size of the transform block used by the image block is similar to step 604, except that: the size of the transform block corresponding to the $1^{st}$ dividing layer in this embodiment is 2N×2N, and the size of the transform block corresponding to the $2^{nd}$ dividing layer in this embodiment is equivalent to the size of the transform block corresponding to the $1^{st}$ dividing layer in the preceding embodiment; and a size of a transform block corresponding to a $3^{rd}$ dividing layer in this embodiment is equivalent to the size of the transform block corresponding to the $2^{nd}$ dividing layer in the preceding embodiment; and the rest may be deduced by analogy.

Figure 7A:
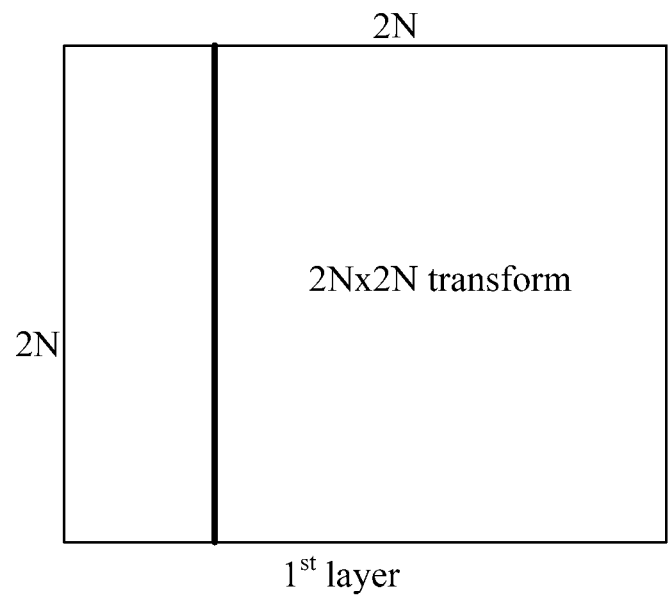
FIG. 7a is a schematic diagram of applying a transform block whose size is 2N×2N to an image block.
Figure 7B:
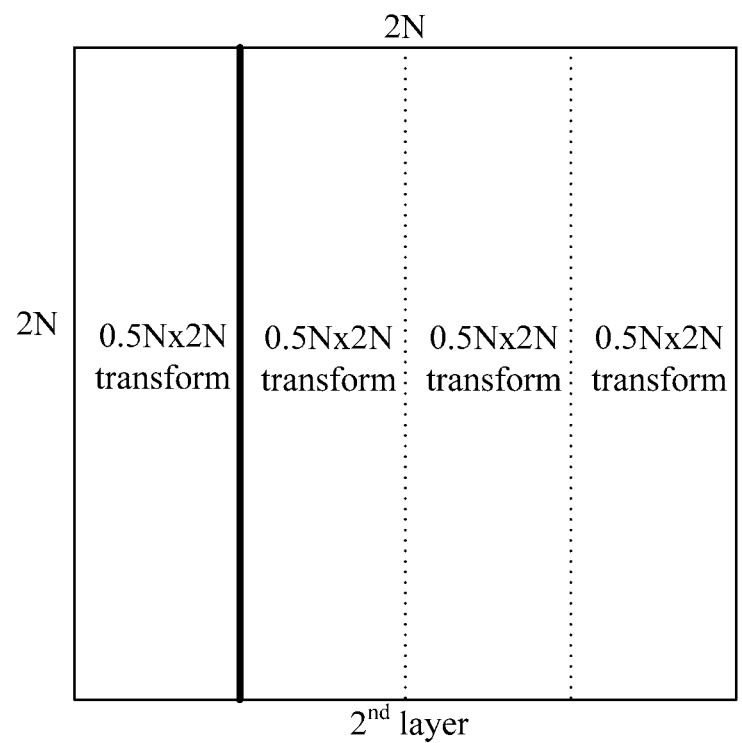
FIG. 7b is a schematic diagram of applying transform blocks whose sizes are 0.5N×2N to an image block.
Figure 7C:
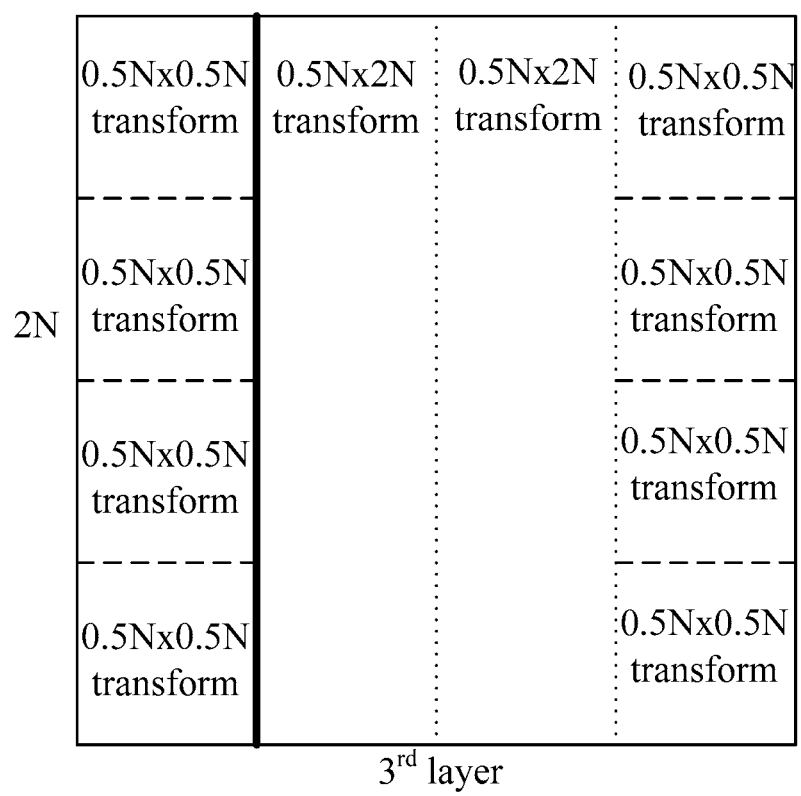
FIG. 7c is a schematic diagram of applying transform blocks whose sizes are 0.5N×2N and transform blocks whose sizes are 0.5N×0.5N to an image block.

For example, when an nL×2N dividing manner is applied to the image block, and as shown in FIG. 7a, if it is determined in step 703 that a very good transform effect can be achieved by applying a 2N×2N transform block, in this case, the size of the transform block corresponding to the $1^{st}$ dividing layer of the image block is 2N×2N. In this case, the transform block may cross a boundary of an image sub-block; when the device for coding an image determines to use transform blocks of the $2^{nd}$ dividing layer, a size of a transform block which is of the $2^{nd}$ dividing layer and is used by the image block is determined as 0.5N×2N according to the dividing manner of the image block and the dividing layer number. In this case, the image block is divided into four 0.5N×2N data blocks, and each block separately uses a 0.5N×2N transform block, as shown in FIG. 7b. As shown in FIG. 7c, when a first and a fourth 0.5N×2N data blocks need to use transform blocks obtained through further dividing, it is determined, according to the dividing manner of the image block and the dividing layer number, a horizontal size of a transform block obtained through further dividing the two 0.5N×2N transform blocks is consistent with a horizontal size of a transform block corresponding to the $2^{nd}$ dividing layer, and a vertical size is one fourth of a vertical size of the transform block corresponding to the $2^{nd}$ dividing layer. In this case, the first and the fourth 0.5N×2N data blocks are divided into four 0.5N×0.5N blocks, and each block separately uses a 0.5N×0.5N transform block.

705: The device for coding an image determines identification information that identifies the dividing layer number where the transform block used by the image block is located.

Specifically, as shown in FIG. 7a, determined identification information that identifies a corresponding dividing layer number of each transform block corresponding to a prediction block includes one bit whose value is a first specific value, such as 1, used to indicate that a transform block (that is, a 2N×2N transform block) corresponding to the $1^{st}$ dividing layer is not further divided. As shown in FIG. 7b, identification information that identifies a corresponding dividing layer number of each transform block corresponding to a prediction block includes two layers of indication information. A first layer of indication information includes one bit whose value is a second specific value, such as 0, used to indicate that a transform block (that is, a 2N×2N transform block) corresponding to the $1^{st}$ dividing layer needs to be further divided to obtain four transform blocks of the $2^{nd}$ dividing layer; and a second layer of indication information includes four bits whose values are 1, indicating that the four transform blocks of the $2^{nd}$ dividing layer do not need to be further divided. As shown in FIG. 7c, identification information that identifies a corresponding dividing layer number of each transform block corresponding to a prediction block includes at least two layers of indication information. A first layer of indication information includes one bit whose value is a second specific value, such as 0, used to indicate that a transform block (that is, a 2N×2N transform block) corresponding to the $1^{st}$ dividing layer needs to be further divided to obtain four transform blocks (that is, 0.5N×2N transform blocks) of the $2^{nd}$ dividing layer; and a second layer of indication information includes four bits. Values of a second and a third bits are 1, indicating that two transform blocks in the middle of the figure do not need to be further divided; and values of a first and a fourth bits are 0, indicating that two transform blocks on two sides of the figure need to be further divided to obtain four transform blocks (that is, 0.5N×0.5N transform blocks) of the $3^{rd}$ dividing layer. In this case, when a dividing layer number allowed in the predetermined nL×2N image block dividing manner is 3 or when a minimum transform block size allowed in the predetermined nL×2N image block dividing manner is 0.5N×0.5N, the identification information that identifies the corresponding dividing layer number of the transform block corresponding to the prediction block needs to include only two layers of indication information; otherwise, the indication information further includes a third layer of indication information, where the third layer of indication information is used to indicate whether the four transform blocks of the $3^{rd}$ dividing layer need to be further divided.

706: The device for coding an image transforms the residual of the image block by using the corresponding transform block, performs quantification, and codes a quantified value.

707: The device for coding an image writes the identification information that identifies the dividing layer number where the transform block used by the image block is located, a coding result of step 706, and indication information that indicates the dividing manner of the image block into a code stream, and sends the code stream.

In the foregoing embodiment of the present disclosure, during determination of a size of a transform block used by an image block, a dividing manner of the image block is considered, and identification information that identifies a dividing layer number where the transform block used by the image block is located is written into a code stream, so that the size of the transform block is identified by using a layer-by-layer identification method. This ensures that the transform block does not cross a boundary of a prediction block while the size of the transform block is effectively identified, thereby effectively improving coding efficiency.

Embodiment 4

The following specifically describes obtaining a size of a corresponding transform block according to a dividing manner of an image block and a corresponding dividing layer number of a transform block corresponding to the image block or a prediction block and by using a table lookup manner:

First manner: Determine a transform block size corresponding to both a dividing manner of an image block and a dividing layer number by using preset correspondence between the two of the dividing manner of the image block and the dividing layer number, and a transform block size. The dividing layer number is a corresponding dividing layer number of the transform block corresponding to the image block or the prediction block. The following Table 1 shows correspondence between two of a dividing manner of an image block and a dividing layer number, and a transform block size.

TABLE 1

| Dividing Layer Number | N × 2N Image Block Dividing Manner | nL × 2N Image Block Dividing Manner |
| --- | --- | --- |
| 1$^{st}$ layer | N × 2N | 0.5N × 2N |
| 2$^{nd}$ layer | N × N | 0.5N × 0.5N |

Second manner: Determine a first-type size ratio corresponding to both a dividing manner of an image block and a dividing layer number by using preset correspondence between the two of the dividing manner of the image block and the dividing layer number, and a first-type size ratio, where the dividing layer number is a corresponding dividing layer number of the transform block corresponding to the image block or the prediction block; and then determine, according to the determined first-type size ratio and a size of the image block, a size of the transform block corresponding to the image block or the prediction block. The first-type size ratio includes a ratio of a horizontal size of the transform block corresponding to the image block or the prediction block to a horizontal size of the image block, and a ratio of a vertical size of the transform block corresponding to the image block or the prediction block to a vertical size of the image block. The following Table 2 shows correspondence between two of a dividing manner of an image block and a dividing layer number, and a ratio of a horizontal size of a transform block to a horizontal size of an image block. The following Table 3 shows correspondence between two of a dividing manner of an image block and a dividing layer number, and a ratio of a vertical size of a transform block to a vertical size of an image block.

TABLE 2

| Dividing Layer Number | N × 2N Image Block Dividing Manner | nL × 2N Image Block Dividing Manner |
| --- | --- | --- |
| 1$^{st}$ layer | 0.5 | 0.25 |
| 2$^{nd}$ layer | 0.5 | 0.25 |

TABLE 3

| Dividing Layer Number | N × 2N Image Block Dividing Manner | nL × 2N Image Block Dividing Manner |
| --- | --- | --- |
| 1$^{st}$ layer | 1 | 1 |
| 2$^{nd}$ layer | 0.5 | 0.25 |

Third manner: Determine a second-type size ratio corresponding to both a dividing manner of an image block and a dividing layer number by using preset correspondence between the two of the dividing manner of the image block and the dividing layer number, and a second-type size ratio, where the dividing layer number is a corresponding dividing layer number of the transform block corresponding to the image block or the prediction block; and then determine, according to the determined second-type size ratio and a size of the prediction block, a size of the transform block corresponding to the image block or the prediction block. The second-type size ratio includes a ratio of a horizontal size of the transform block corresponding to the image block or the prediction block to a horizontal size of the prediction block, and a ratio of a vertical size of the transform block corresponding to the image block or the prediction block to a vertical size of the prediction block. In a specific implementation manner, the second-type size ratio may specifically include: a ratio of a horizontal size of the transform block corresponding to the image block or the prediction block to a horizontal size of a smallest prediction block, and a ratio of a vertical size of the transform block corresponding to the image block or the prediction block to a vertical size of the smallest prediction block; and then determine, according to the determined second-type size ratio and a size of the smallest prediction block, a size of the transform block corresponding to the image block or the prediction block. Table 4 shows correspondence between two of a dividing manner of an image block and a dividing layer number, and a ratio of a horizontal size of a transform block to a horizontal size of a smallest prediction block. Table 5 shows correspondence between two of a dividing manner of an image block and a dividing layer number, and a ratio of a vertical size of a transform block to a vertical size of a smallest prediction block.

TABLE 4

| Dividing Layer Number | N × 2N Image Block Dividing Manner | nL × 2N Image Block Dividing Manner |
| --- | --- | --- |
| 1$^{st}$ layer | 1 | 1 |
| 2$^{nd}$ layer | 1 | 1 |

TABLE 5

| Dividing Layer Number | N × 2N Image Block Dividing Manner | nL × 2N Image Block Dividing Manner |
|---|---|---|
| 1st layer | 1 | 1 |
| 2nd layer | 0.5 | 0.25 |

It should be noted that the foregoing manners of obtaining a size of a transform block provided in this embodiment may be applied to other embodiments. That is, in a process of executing steps for obtaining a size of a transform block in other embodiments, the technical solutions provided in this embodiment may be used.

Embodiment 5

The following embodiment of the present disclosure provides another method for coding an image. A difference between this embodiment and the foregoing two embodiments mainly lies in that this embodiment uses a layer-by-layer identification method by using a prediction block as a unit.

Steps 801 to 802 are the same as steps 601 to 602, and details are not repeatedly described herein.

803: The device for coding an image determines a corresponding dividing layer number of a transform block corresponding to the prediction block in the prediction block. A size of a transform block corresponding to a $1^{st}$ dividing layer is a size of a smallest prediction block.

A specific implementation manner of this step is similar to that of step 603, and details are not repeatedly described herein.

804: The device for coding an image determines, according to the dividing manner of the image block and the determined dividing layer number, a size of the transform block corresponding to the prediction block.

Figure 8:
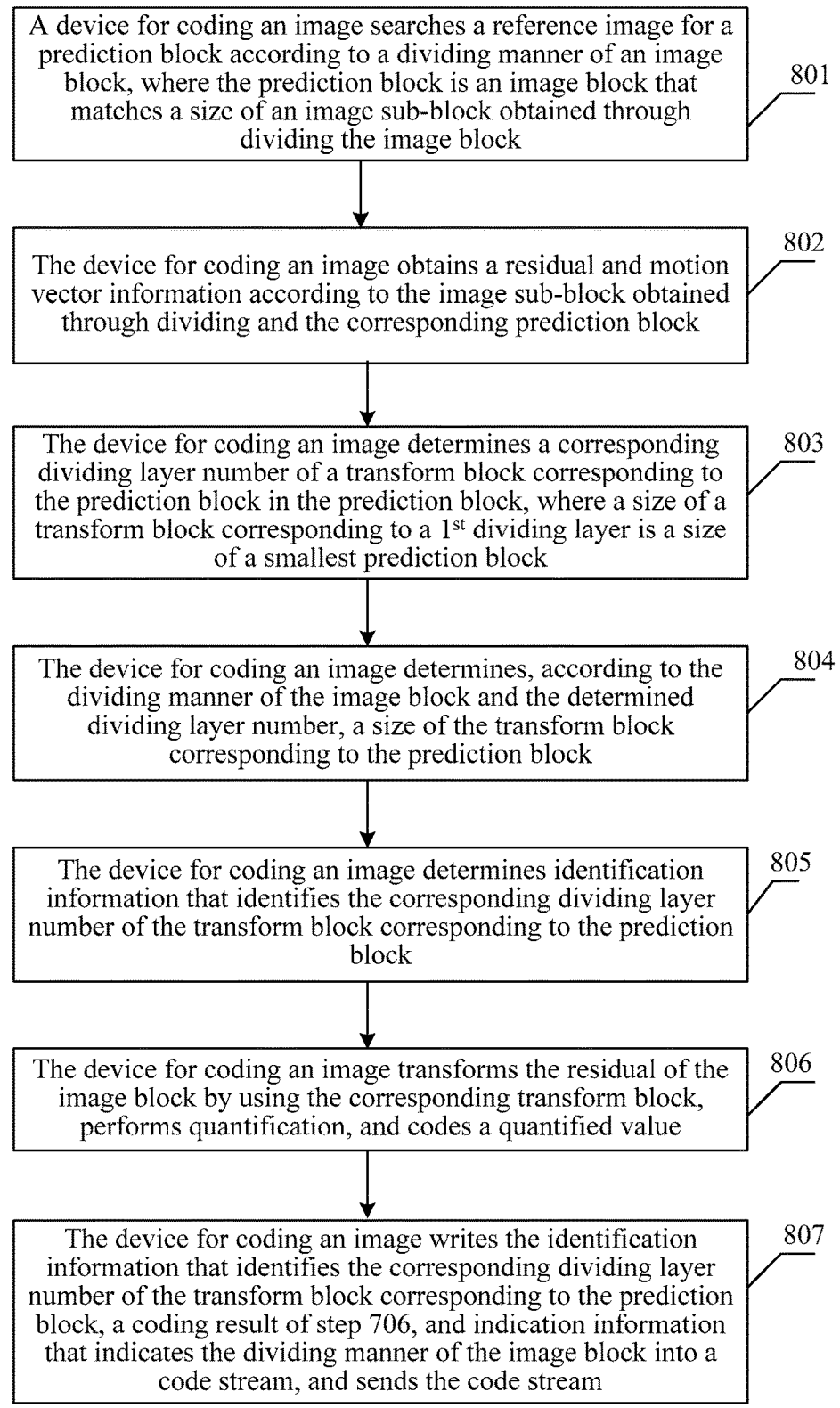
FIG. 8 is a flowchart of a method for coding an image according to Embodiment 5 of the present disclosure.
Figure 8A:
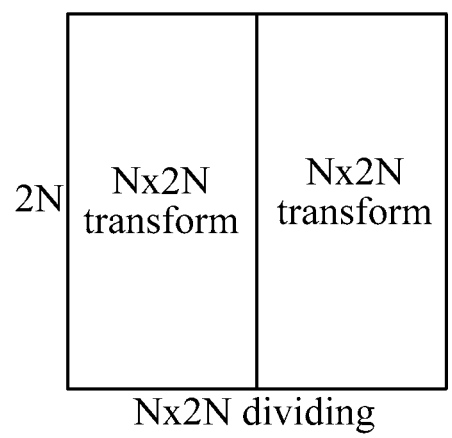
FIG. 8a is a schematic diagram indicating that two prediction blocks correspond to N×2N transform blocks.
Figure 8B:
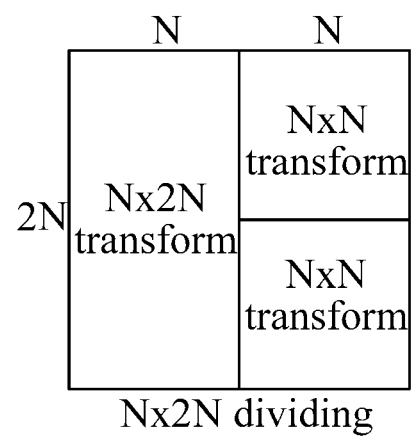
FIG. 8b is a schematic diagram indicating that a left prediction block corresponds to an N×2N transform block and right prediction blocks correspond to N×N transform blocks.
Figure 8C:
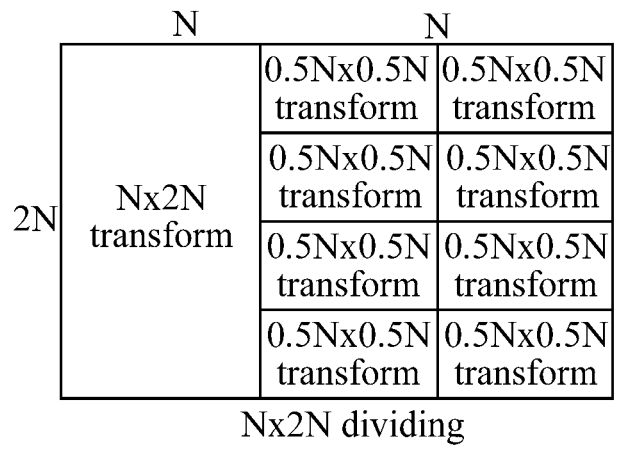
FIG. 8c is a schematic diagram indicating that a left prediction block corresponds to an N×2N transform block and right prediction blocks correspond to 0.5N×0.5N transform blocks.

For example, when the dividing manner corresponding to the image block is N×2N dividing, the image block is divided into two image sub-blocks whose sizes are N×2N, and in this case, a size of a prediction block is N×2N. In this case, as shown in FIG. 8a, both transform blocks corresponding to two prediction blocks are transform blocks of the $1^{st}$ dividing layer, sizes of the transform blocks used by the two prediction blocks are N×2N, and subsequently, a dividing flag is set separately for the two prediction blocks to indicate that the $1^{st}$ dividing layer is used. As shown in FIG. 8b, a dividing layer of a transform block corresponding to a left prediction block of the image block is still the $1^{st}$ dividing layer, and a dividing layer of transform blocks corresponding to a right prediction block is a $2^{nd}$ dividing layer. Therefore, a size of the transform block used by the left prediction block is still N×2N, and a size of a transform block used by the right prediction block is determined as N×N according to a dividing layer number (the $2^{nd}$ dividing layer) and the dividing manner (N×2N) of the image block. Subsequently, a dividing flag is set separately for the left and the right prediction blocks to indicate that the left prediction block uses the $1^{st}$ dividing layer and the right prediction block uses the $2^{nd}$ dividing layer. As shown in FIG. 8c, a dividing layer of a transform block corresponding to a left prediction block of the image block is still the $1^{st}$ dividing layer, and a dividing layer of transform blocks corresponding to a right prediction block is a $3^{rd}$ dividing layer. Therefore, a size of the transform block used by the left prediction block is still N×2N, and a size of a transform block used by the right prediction block is determined as 0.5N×0.5N according to a dividing layer number (the $3^{rd}$ dividing layer) and the dividing manner (N×2N) of the image block. A dividing flag is set separately for the left and the right prediction blocks to indicate that the left prediction block uses the $1^{st}$ dividing layer and the right prediction block uses the $3^{rd}$ dividing layer.

805: The device for coding an image determines identification information that identifies the corresponding dividing layer number of the transform block corresponding to the prediction block.

As shown in FIG. 8a, determined identification information that identifies a corresponding dividing layer number of a transform block corresponding to a left prediction block includes one bit whose value is a first specific value, such as 1, used to indicate that an N×2N transform block corresponding to the $1^{st}$ dividing layer is not further divided; and determined identification information that identifies a corresponding dividing layer number of a transform block corresponding to a right prediction block includes one bit whose value is a first specific value, used to indicate that an N×2N transform block corresponding to the $1^{st}$ dividing layer is not further divided. As shown in FIG. 8b, identification information that identifies a corresponding dividing layer number of the transform block corresponding to the left prediction block is the same as that of FIG. 8a, and determined identification information that identifies a corresponding dividing layer number of the transform blocks corresponding to the right prediction block includes one bit whose value is a second specific value, used to indicate that an N×2N transform block corresponding to the $1^{st}$ dividing layer is further divided. As shown in FIG. 8c, identification information that identifies a corresponding dividing layer number of the transform block corresponding to the left prediction block is the same as that of FIG. 8a, and determined identification information that identifies a corresponding dividing layer number of the transform blocks corresponding to the right prediction block includes two layers of indication information. A first layer of indication information includes one bit whose value is a second specific value, used to indicate that an N×2N transform block corresponding to the $1^{st}$ dividing layer needs to be further divided to obtain two transform blocks (whose sizes are N×N) of the $2^{nd}$ dividing layer; and a second layer of indication information includes two bits, used to indicate that the two transform blocks of the $2^{nd}$ dividing layer are further divided, so that it may be expressed that the right prediction block uses obtained transform blocks of the $3^{rd}$ dividing layer.

806: The device for coding an image transforms the residual of the image block by using the corresponding transform block, performs quantification, and codes a quantified value.

807: The device for coding an image writes the identification information that identifies the dividing layer number where the transform block corresponding to the prediction block is located, a coding result of step 806, and indication information that indicates the dividing manner of the image block into a code stream, and sends the code stream.

In the foregoing embodiment of the present disclosure, during determination of a size of a transform block corresponding to a prediction block, a dividing manner of an image block is considered, and identification information that identifies a dividing layer number where the transform block corresponding to the prediction block is located is written into a code stream, so that the size of the transform block is identified by using a layer-by-layer identification method. This ensures that the transform block does not cross a boundary of the prediction block while the size of the transform block is effectively identified, thereby effectively improving coding efficiency.

Embodiment 6

Figure 9:
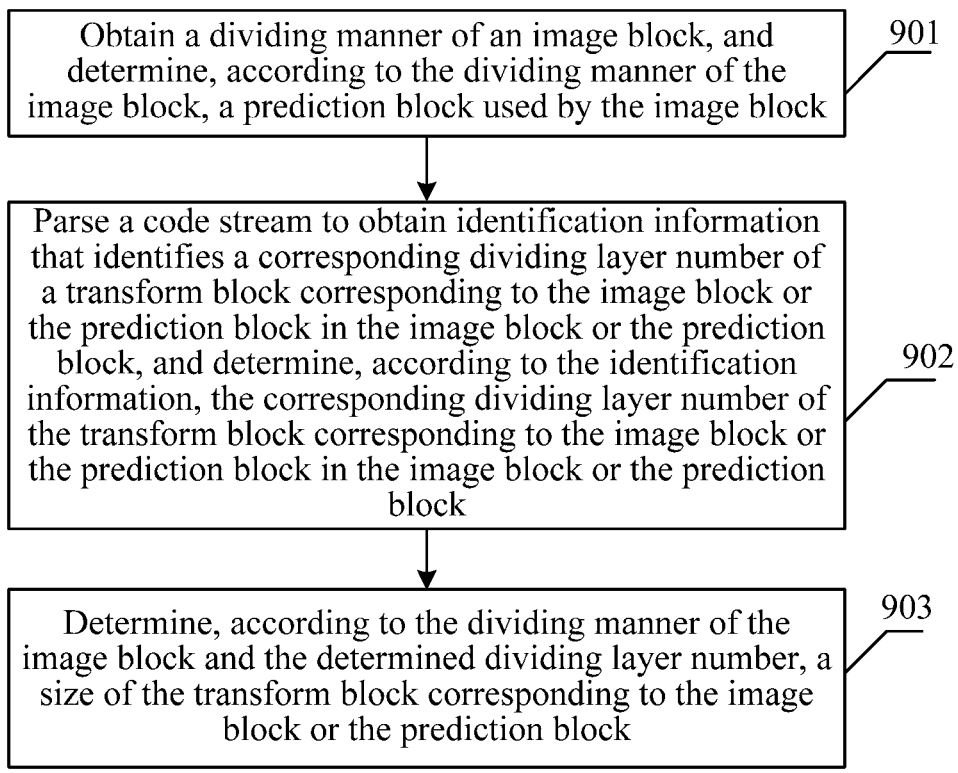
FIG. 9 is a flowchart of a method for decoding an image according to Embodiment 6 of the present disclosure.

Referring to FIG. 9, this embodiment of the present disclosure provides a method for decoding an image. The method specifically includes:

901: Obtain a dividing manner of an image block, and determine, according to the dividing manner of the image block, a prediction block used by the image block.

An execution body of each step of this embodiment is a device for decoding an image.

In this step, the device for decoding an image obtains the dividing manner of the image block from a code stream sent by a device for coding an image, that is, obtains the dividing manner of the image block by parsing the code stream. Dividing manners of an image block may be classified into an nL×2N dividing manner and a 2N×nL dividing manner. For details, reference may be made to corresponding description of step 501, and details are not repeatedly described herein. In this step, the determining, according to the dividing manner of the image block, a prediction block used by the image block specifically includes: determining, according to the dividing manner of the image block, a size of the prediction block used by the image block.

902: Parse the code stream to obtain identification information that identifies a corresponding dividing layer number of a transform block corresponding to the image block or the prediction block in the image block or the prediction block, and determine, according to the identification information, the corresponding dividing layer number of the transform block corresponding to the image block or the prediction block in the image block or the prediction block, where the transform block corresponding to the image block or the prediction block includes one or more transform blocks.

This step includes the following: When the identification information includes an identifier used to indicate that a transform block corresponding to an $N^{th}$ dividing layer is not further divided, determining, by the device for decoding an image according to the identification information, that a corresponding dividing layer number of at least one transform block corresponding to the image block or the prediction block in the image block or the prediction block is the $N^{th}$ dividing layer; when the identification information includes an identifier used to indicate that at least one transform block corresponding to an $N^{th}$ dividing layer is further divided, determining, by the device for decoding an image according to the identification information, that a corresponding dividing layer number of the at least one transform block corresponding to the image block or the prediction block in the image block or the prediction block is greater than the $N^{th}$ dividing layer.

A specific process of determining, according to the identification information, the corresponding dividing layer number of the transform block corresponding to the prediction block in the prediction block includes:

reading an $N^{th}$ layer of indication information from the identification information, and determining whether a value of a bit in the $N^{th}$ layer of indication information is a first specific value or a second specific value; and when N is equal to M−1, and if the value of the bit in the $N^{th}$ layer of indication information is the first specific value, determining that a corresponding dividing layer number of a transform block corresponding to the bit is the $N^{th}$ dividing layer; if the value of the bit in the $N^{th}$ layer of indication information is the second specific value, determining that a corresponding dividing layer number of a transform block corresponding to the bit is an $M^{th}$ dividing layer, where M is a predetermined dividing layer number or a predetermined dividing layer number corresponding to a smallest transform block, and N is greater than or equal to 1;

when N is smaller than M−1, and if the value of the bit in the $N^{th}$ layer of indication information is the first specific value, determining that a corresponding dividing layer number of a transform block corresponding to the bit is the $N^{th}$ dividing layer; if the value of the bit in the $N^{th}$ layer of indication information is the second specific value, continuing to read a next layer of indication information from the identification information, till an $(M-1)^{th}$ layer of indication information is read or an $(N+a)^{th}$ layer of indication information in which values of all bits are the first specific value is read, where N+a is smaller than or equal to M.

In the process of determining the corresponding dividing layer number of the transform block corresponding to the prediction block in the prediction block, when N is equal to 1, the number of bits in the $N^{th}$ layer of indication information is the number of smallest prediction blocks among prediction blocks; or in the process of determining the corresponding dividing layer number of the transform block corresponding to the image block in the prediction block, when N is equal to 1, the number of bits in a $1^{st}$ layer of indication information is 1; and when N is equal to 2, the number of bits in a $2^{nd}$ layer of indication information is the number of smallest prediction blocks in the image block.

903: Determine, according to the dividing manner of the image block and the determined dividing layer number, a size of the transform block corresponding to the image block or the prediction block.

A specific implementation process of this step is similar to an operation process of the device for coding an image, and details are not repeatedly described herein.

In this embodiment of the present disclosure, during determination of a size of a transform block, a dividing manner of an image block is considered, and identification information that identifies a corresponding dividing layer number of a transform block corresponding to the image block or a prediction block is written into a code stream, so that the size of the transform block is identified by using a layer-by-layer identification method. This ensures that the transform block does not cross a boundary of the prediction block while the size of the transform block is effectively identified, thereby effectively improving coding efficiency.

To make the foregoing technical solutions provided by the present disclosure more comprehensible, the following two embodiments introduce the foregoing technical solutions of the present disclosure in detail:

Embodiment 7

Figure 10:
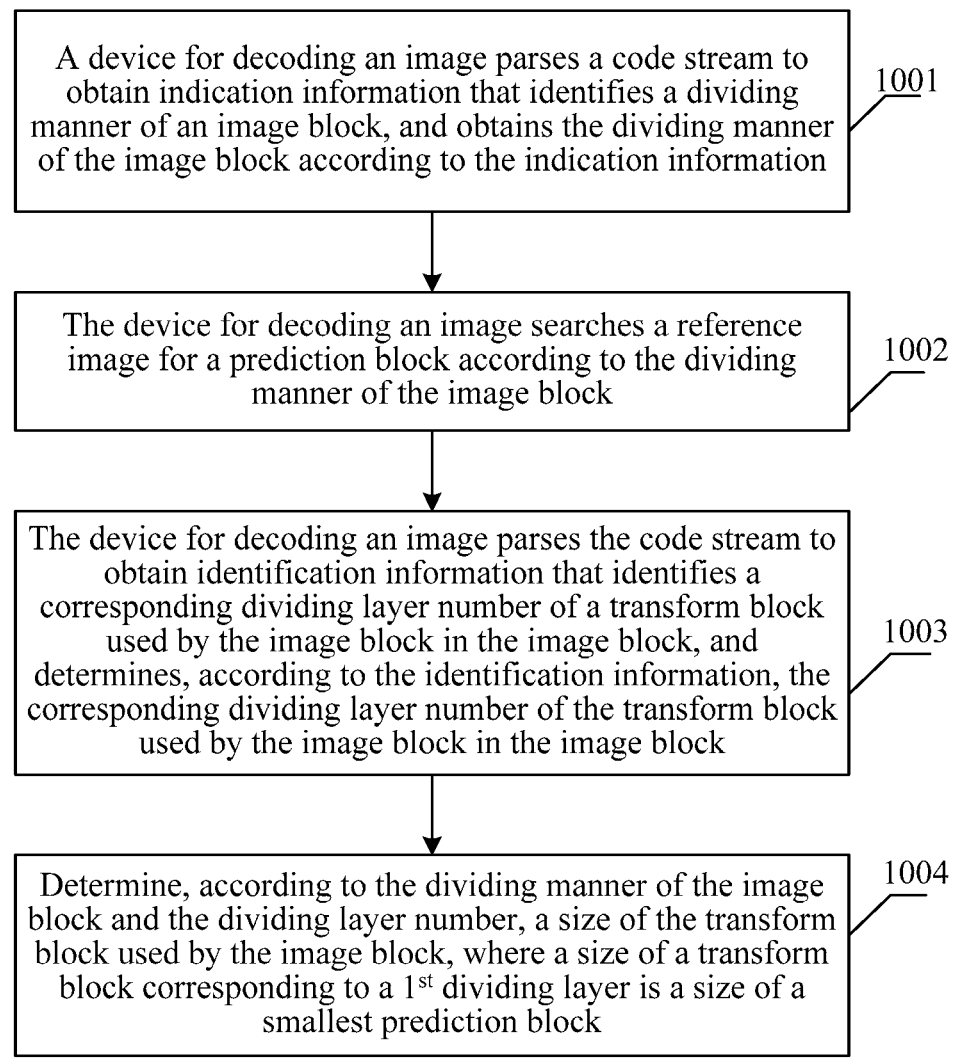
FIG. 10 is a flowchart of a method for decoding an image according to Embodiment 7 of the present disclosure.

Referring to FIG. 10, this embodiment of the present disclosure provides a method for decoding an image. The method for decoding an image corresponds to the method for coding an image shown in FIG. 6, and specifically includes:

1001: A device for decoding an image parses a code stream to obtain indication information that identifies a dividing manner of an image block, and obtains the dividing manner of the image block according to the indication information.

As described in the foregoing, the dividing manner of the image block may be an N×2N dividing manner or an nL×2N dividing manner.

1002: The device for decoding an image searches a reference image for a prediction block according to the dividing manner of the image block, where the prediction block is an image block that matches a size of an image sub-block obtained through dividing the image block.

1003: The device for decoding an image parses the code stream to obtain identification information that identifies a corresponding dividing layer number of a transform block used by the image block in the image block, and determines, according to the identification information, the corresponding dividing layer number of the transform block used by the image block in the image block.

1004: Determine, according to the dividing manner of the image block and the dividing layer number, a size of the transform block used by the image block, where a size of a transform block corresponding to a $1^{st}$ dividing layer is a size of a smallest prediction block.

Specifically, step 1003 and step 1004 include:

determining, by the device for decoding an image according to the dividing manner, the number of bits in a $1^{st}$ layer of indication information of the identification information, that is, the number of smallest prediction blocks of the image block is the number of bits in the $1^{st}$ layer of indication information; when the dividing manner of the image block is N×2N, determining that the number of bits in the $1^{st}$ layer of indication information is 2; when the dividing manner of the image block is nL×2N, for example, the number of bits in the $1^{st}$ layer of indication information is 4 when the image block is divided into two image sub-blocks of 0.5N×2N and 1.5N×2N; when the $1^{st}$ layer of indication information indicates that a size of a transform block corresponding to the image block is not divided into a smaller size, determining that a dividing layer number corresponding to a current image block is the $1^{st}$ dividing layer; when the dividing manner of the image block is N×2N, determining that the size of the transform block corresponding to the image block is N×2N, that is, a size of a transform block corresponding to the $1^{st}$ dividing layer is consistent with a size of the prediction block; when the dividing manner of the image block is nL×2N, determining that the size of the transform block is 0.5N×2N, that is, a size of a transform block corresponding to the $1^{st}$ dividing layer is consistent with a size of a smallest prediction block among prediction blocks; when the $1^{st}$ layer of indication information indicates that sizes of some transform blocks of the $1^{st}$ dividing layer are divided into a smaller size, incrementing a current dividing layer number by 1, that is, the dividing layer number becomes a $2^{nd}$ dividing layer; when the dividing manner of the image block is N×2N, determining that a size of a transform block of the $2^{nd}$ dividing layer corresponding to the image block is N×N, that is, a horizontal size corresponding to a lower-layer transform block is the same as a horizontal size of a transform block corresponding to a current layer, and a vertical size corresponding to the lower-layer transform block is half of a vertical size of the transform block corresponding to the current layer, as shown in FIG. 6b; when the dividing manner of the image block is nL×2N, determining that a size of a lower-layer transform block is 0.5N×0.5N, that is, a horizontal size corresponding to the lower-layer transform block is the same as a horizontal size of a transform block corresponding to a current layer, and a vertical size corresponding to the lower-layer transform block is one fourth of a vertical size of the transform block corresponding to the current layer, as shown in FIG. 6d.

A dividing layer number allowed in a certain dividing manner may be predetermined in a device for coding an image and the device for decoding an image, or a minimum transform size allowed in a certain dividing manner may be predetermined in a device for coding an image and the device for decoding an image. A specific implementation manner is the same as that of a coding end, and details are not repeatedly described herein. Specifically, a manner of determining, according to the dividing manner of the image block and the dividing layer number, a size of the transform block used by the image block is the same as the method described in the preceding Embodiment 4, and details are not repeatedly described herein.

In this embodiment of the present disclosure, during determination of a size of a transform block used by an image block, a dividing manner of the image block is considered, and identification information that identifies a corresponding dividing layer number of the transform block used by the image block is written into a code stream, so that the size of the transform block is identified by using a layer-by-layer identification method. This ensures that the transform block does not cross a boundary of a prediction block while the size of the transform block is effectively identified, thereby effectively improving coding efficiency.

Embodiment 8

Figure 11:
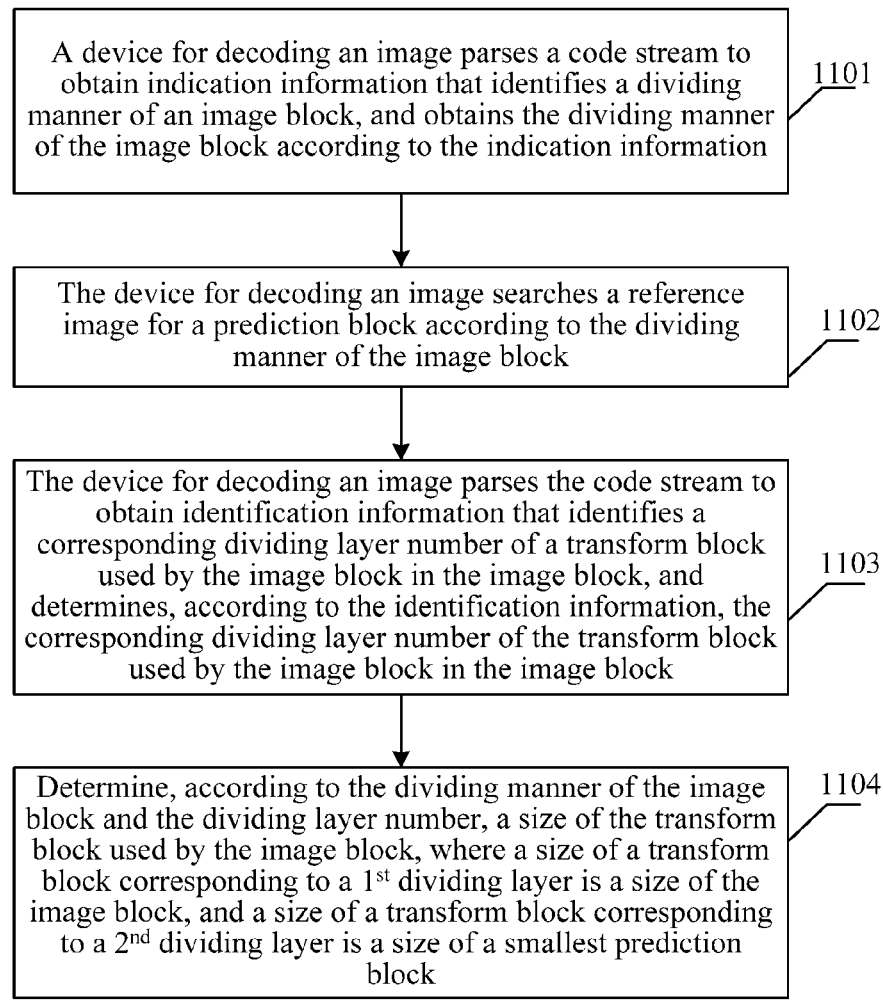
FIG. 11 is a flowchart of a method for decoding an image according to Embodiment 8 of the present disclosure.

Referring to FIG. 11, this embodiment of the present disclosure provides a method for decoding an image. The method for decoding an image corresponds to the method for coding an image shown in FIG. 7, and specifically includes:

Steps 1111 to 1102 are the same as steps 1001 to 1002, and details are not repeatedly described herein.

Step 1113: The device for decoding an image parses the code stream to obtain identification information that identifies a dividing layer number of a transform block used by the image block, and determines, according to the identification information, the corresponding dividing layer number of the transform block used by the image block in the image block.

Specifically, a $1^{st}$ layer of indication information is acquired from the identification information that identifies the dividing layer number of the transform block corresponding to the prediction block of the image block, where the $1^{st}$ layer of indication information includes one bit, that is, a first bit is acquired. It is determined, according to a value of the first bit, whether to further divide a $1^{st}$ dividing layer. If the value of the first bit indicates that the $1^{st}$ dividing layer is not further divided, the transform block corresponding to the image block is determined as one transform block, that is, a 2N×2N transform block; if the value of the first bit indicates that the $1^{st}$ dividing layer is further divided, the number of bits in a $2^{nd}$ layer of indication information of the identification information is determined according to a size of a smallest prediction block among prediction blocks of the image block. For example, if a dividing manner is 0.5N×2N, the size of the smallest prediction block is also 0.5N×2N, and the image block whose size is 2N×2N corresponds to four transform blocks whose sizes are the same as the size of the smallest prediction block. Therefore, the number of bits in the $2^{nd}$ layer of indication information is determined as 4, and the four bits are read. If bit values are a first specific value, such as 1, it indicates that a transform block of a $2^{nd}$ dividing layer is not further divided; if bit values are a second specific value, such as 0, it indicates that a transform block of a $2^{nd}$ dividing layer is further divided. In a schematic diagram shown in FIG. 7b, all the four bits are the first specific value, and in this case, the corresponding dividing layer number of the transform block used by the image block in the image block is the $2^{nd}$ dividing layer. That is, it is determined that each transform block used by the image block is a transform block of the $2^{nd}$ dividing layer. In a schematic diagram shown in FIG. 7c, a second and a third bits of the four bits are the first specific value, indicating that transform blocks corresponding to the second and the third bits of the $2^{nd}$ dividing layer do not need to be further divided, and a dividing layer number of the transform blocks which correspond to the second and the third bits of the four bits and are used by the image block is the $2^{nd}$ dividing layer. A first and a fourth bits are the second specific value, indicating that transform blocks corresponding to the first and the fourth bits of the $2^{nd}$ dividing layer need to be further divided to obtain four transform blocks of a $3^{rd}$ dividing layer. In this case, when a dividing layer number allowed in this dividing manner is the $3^{rd}$ layer, or a minimum transform block size allowed in this dividing manner is 0.5N×0.5N, it is determined that the image block needs to correspond to the transform blocks obtained through further dividing the transform blocks corresponding to the first and the fourth bits of the four bits, and a corresponding dividing layer number of the transform blocks is the $3^{rd}$ dividing layer.

Step 1104: Determine, according to the dividing manner of the image block and the dividing layer number, a size of the transform block used by the image block, where a size of a transform block corresponding to the $1^{st}$ dividing layer is a size of the image block, that is, 2N×2N; and a size of a transform block corresponding to the $2^{nd}$ dividing layer is the size of the smallest prediction block.

When a dividing layer number corresponding to the image block is the $1^{st}$ dividing layer, and if the dividing manner of the image block is nL×2N, the size of the transform block corresponding to the image block is determined as 2N×2N. That is, the size of the transform block corresponding to the $1^{st}$ dividing layer is consistent with that of the image block, as shown in FIG. 7a. When the dividing layer number corresponding to the image block is the $2^{nd}$ dividing layer, and if the dividing manner of the image block is nL×2N, the size of the transform block corresponding to the image block is determined as 0.5N×2N according to the dividing manner of the image block and the dividing layer number (that is, the $2^{nd}$ dividing layer). That is, the size of the transform block corresponding to the $2^{nd}$ dividing layer is consistent with the size of the smallest prediction block among the prediction blocks, as shown in FIG. 7b. When a certain 0.5N×2N data block of the image block needs to use transform blocks of the $3^{rd}$ dividing layer, a size of a used transform blocks is determined as 0.5N×0.5N according to the dividing manner of the image block and the dividing layer number (that is, the $3^{rd}$ dividing layer). That is, a horizontal size of a lower-layer transform block is the same as a horizontal size of a transform block corresponding to a current layer, and a vertical size of the lower-layer transform block is one fourth of a vertical size of the transform block corresponding to the current layer, as shown in FIG. 7c.

Specifically, a manner of determining, according to the dividing manner of the image block and the dividing layer number, a size of the transform block used by the image block is the same as the method described in the preceding Embodiment 4, and details are not repeatedly described herein.

In this embodiment of the present disclosure, during determination of a size of a transform block used by an image block, a dividing manner of the image block is considered, and identification information that identifies a dividing layer number of the transform block used by the image block is written into a code stream, so that the size of the transform block is identified by using a layer-by-layer identification method. This ensures that the transform block does not cross a boundary of a prediction block while the size of the transform block is effectively identified, thereby effectively improving coding efficiency.

Accordingly, this embodiment of the present disclosure provides a method for decoding an image. The method for decoding an image corresponds to the method for coding an image shown in FIG. 7. A device for decoding an image separately parses dividing flags (that is, identification information that identifies corresponding dividing layers of transform blocks corresponding to prediction blocks) corresponding to two prediction blocks; separately determines, according to the dividing flags of the two prediction blocks, corresponding dividing layer numbers of transform blocks corresponding to the two prediction blocks; and separately determines, according to a dividing manner of an image block and the determined dividing layer numbers, sizes of the transform blocks corresponding to the two prediction blocks.

It should be noted that the preceding embodiments are described by taking the nL×2N dividing manner as an example. It should be understood that the technical solutions provided by the preceding embodiments of the present disclosure also apply to dividing manners such as nR×N, 2N×nU, 2N×nD, 2N×N, and N×2N.

Figure 12:
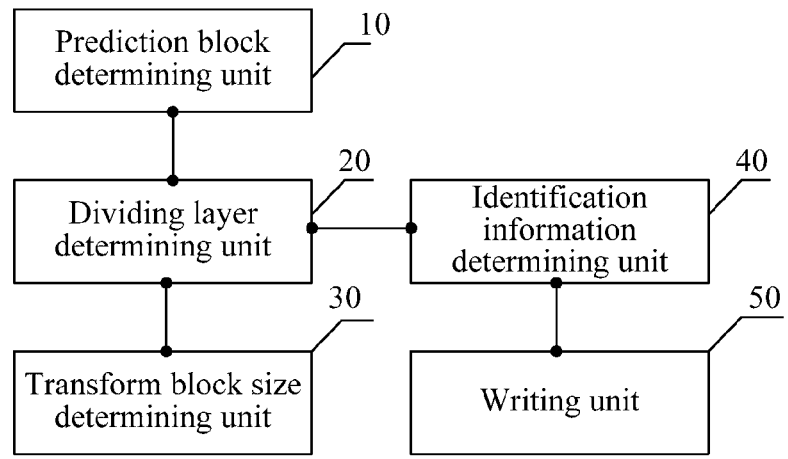
FIG. 12 is a structural diagram of a device for coding an image according to an embodiment of the present disclosure.

Referring to FIG. 12, this embodiment of the present disclosure provides a device for coding an image. The device includes:

a prediction block determining unit 10, configured to determine, according to a dividing manner of an image block, a prediction block used by the image block;

a dividing layer determining unit 20, configured to determine a corresponding dividing layer number of a transform block corresponding to the image block or the prediction block in the image block or the prediction block, where the transform block corresponding to the image block or the prediction block includes one or more transform blocks;

a transform block size determining unit 30, configured to determine, according to the dividing manner of the image block and the dividing layer number, a size of the transform block corresponding to the image block or the prediction block;

an identification information determining unit 40, configured to determine identification information that identifies the corresponding dividing layer number of the transform block corresponding to the image block or the prediction block; and a writing unit 50, configured to write the identification information into a code stream.

For a relationship between a size of a transform block corresponding to an upper dividing layer and a size of a transform block corresponding to a lower dividing layer (such as a relationship between a size of a transform block corresponding to an $N^{th}$ dividing layer and a size of a transform block corresponding to an $(N+1)^{th}$ dividing layer, where the $N^{th}$ dividing layer is an upper dividing layer of the $(N+1)^{th}$ dividing layer, and the $(N+1)^{th}$ dividing layer is a lower dividing layer of the $N^{th}$ dividing layer), and regulations on a size of a transform block corresponding to a dividing layer, reference may be made to corresponding description of the method embodiments, and details are not repeatedly described herein.

Identification information that identifies a corresponding dividing layer number of at least one transform block corresponding to the image block or the prediction block and is determined by the identification information determining unit 40 when the corresponding dividing layer number of the at least one transform block corresponding to the image block or the prediction block in the image block or the prediction block is the $N^{th}$ dividing layer includes: a flag bit indicating that the at least one transform block of the $N^{th}$ dividing layer is not further divided; or identification information that identifies a corresponding dividing layer number of at least one transform block corresponding to the image block or the prediction block and is determined by the identification information determining unit 40 when the corresponding dividing layer number of the at least one transform block corresponding to the image block or the prediction block in the image block or the prediction block is greater than the $N^{th}$ dividing layer includes: a flag bit indicating that a transform block corresponding to the $N^{th}$ dividing layer is further divided.

The transform block size determining unit 30 is configured to query a transform block size corresponding to the dividing manner of the image block and the dividing layer number, where specific correspondence may be shown in Table 1; or the transform block size determining unit 30 is configured to query a first-type size ratio corresponding to the dividing manner of the image block and the dividing layer number, where the first-type size ratio includes a ratio of a horizontal size of the transform block corresponding to the image block or the prediction block to a horizontal size of the image block, and a ratio of a vertical size of the transform block corresponding to the image block or the prediction block to a vertical size of the image block; and determine, according to the first-type size ratio and the horizontal size and the vertical size of the image block, the size of the transform block corresponding to the image block or the prediction block, where specific correspondence may be shown in Table 2 and Table 3; or the transform block size determining unit 30 is configured to query a second-type size ratio corresponding to the dividing manner of the image block and the dividing layer number, where the second-type size ratio includes: a ratio of a horizontal size of the transform block corresponding to the image block or the prediction block to a horizontal size of the prediction block, and a ratio of a vertical size of the transform block corresponding to the image block or the prediction block to a vertical size of the prediction block; and determine, according to the second-type size ratio and the horizontal size and the vertical size of the prediction block, the size of the transform block corresponding to the image block or the prediction block, where the second-type size ratio may specifically include: a ratio of a horizontal size of the transform block corresponding to the image block or the prediction block to a horizontal size of a smallest prediction block, and a ratio of a vertical size of the transform block corresponding to the image block or the prediction block to a vertical size of the smallest prediction block; and then determine, according to the determined second-type size ratio and a size of the smallest prediction block, the size of the transform block corresponding to the image block or the prediction block, where specific correspondence may be shown in Table 4 and Table 5.

In this embodiment of the present disclosure, during determination of a size of a transform block, a dividing manner of an image block is considered, and identification information that identifies a corresponding dividing layer number of a transform block corresponding to the image block or a prediction block is written into a code stream, so that the size of the transform block is identified by using a layer-by-layer identification method. This ensures that the transform block does not cross a boundary of the prediction block while the size of the transform block is effectively identified, thereby effectively improving coding efficiency.

Figure 13:
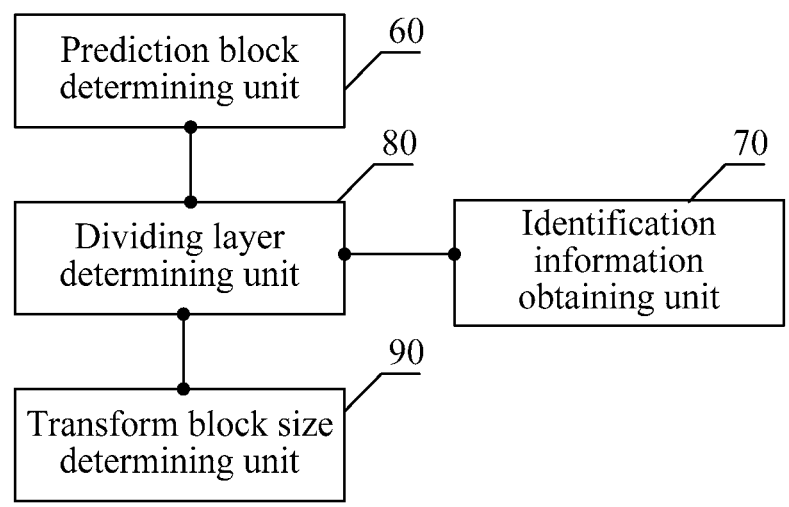
FIG. 13 is a structural diagram of a device for decoding an image according to an embodiment of the present disclosure.

Referring to FIG. 13, this embodiment of the present disclosure provides a device for decoding an image. The device includes:

a prediction block determining unit 60, configured to obtain a dividing manner of an image block, and determine, according to the dividing manner of the image block, a prediction block used by the image block;

an identification information obtaining unit 70, configured to parse a code stream to obtain identification information that identifies a corresponding dividing layer number of a transform block corresponding to the image block or the prediction block in the image block or the prediction block;

a dividing layer determining unit 80, configured to determine, according to the identification information, the corresponding dividing layer number of the transform block corresponding to the image block or the prediction block in the image block or the prediction block, where the transform block corresponding to the image block or the prediction block includes one or more transform blocks; and a transform block size determining unit 90, configured to determine, according to the dividing manner of the image block and the dividing layer number, a size of the transform block corresponding to the image block or the prediction block.

For a relationship between a size of a transform block corresponding to an upper dividing layer and a size of a transform block corresponding to a lower dividing layer, and regulations on a size of a transform block corresponding to a dividing layer, reference may be made to corresponding description of the method embodiments, and details are not repeatedly described herein.

The identification information includes an identifier used to indicate that a transform block corresponding to an $N^{th}$ dividing layer is not further divided, and in this case, the dividing layer determining unit is configured to determine, according to the identification information, that a corresponding dividing layer number of at least one transform block in the transform block corresponding to the image block or the prediction block in the image block or the prediction block is the $N^{th}$ dividing layer; or the identification information includes an identifier used to indicate that at least one transform block corresponding to an $N^{th}$ dividing layer is further divided, and in this case, the dividing layer determining unit is configured to determine, according to the identification information, that a corresponding dividing layer number of the at least one transform block in the transform block corresponding to the image block or the prediction block in the image block or the prediction block is greater than the $N^{th}$ dividing layer.

A structure and a function of the transform block size determining unit 90 are similar to a structure and a function of the transform block size determining unit 30 of the preceding device for coding an image, and details are not repeatedly described herein.

In this embodiment of the present disclosure, during determination of a size of a transform block, a dividing manner of an image block is considered, and identification information that identifies a corresponding dividing layer number of a transform block corresponding to the image block or a prediction block is written into a code stream, so that the size of the transform block is identified by using a layer-by-layer identification method. This ensures that the transform block does not cross a boundary of the prediction block while the size of the transform block is effectively identified, thereby effectively improving coding and decoding efficiency.

In the foregoing methods, a dividing layer number of a transform block corresponding to an image block (or a dividing layer number of a transform block corresponding to a prediction block) is used to determine a size of the transform block; and a specified size of a post-dividing transform block (a width and a height of a transform block) may be obtained according to a specific dividing layer number of the transform block and a dividing manner of the image block. When a dividing layer number is different, the transform block has different sizes, and moreover, a ratio of a width to a height of a transform block corresponding to a specific dividing layer number is also different. For example, taking Embodiment 3 as an example, when the nL×2N dividing manner is applied to the image block, a size of a transform block corresponding to the $1^{st}$ dividing layer is 2N×2N, and a ratio of a width to a height of the transform block is 1:1; a size of a transform block corresponding to the $2^{nd}$ dividing layer is 0.5N×2N, and a ratio of a width to a height of the transform block is 1:4; and a size of a transform block corresponding to the $3^{rd}$ dividing layer is 0.5N×0.5N, and a ratio of a width to a height of the transform block is 1:1. That is to say, a dividing layer number may be used to identify a size of a transform block in a condition of a specific dividing manner of the image block.

A transform block is divided by following certain rules. For example, an initial size of a transform block corresponding to an image block (the size of the transform block corresponding to the $1^{st}$ dividing layer in Embodiment 3) is consistent with a size of the image block; a relationship exists between dividing of the transform block and a dividing manner of the image block; the transform block is always divided into a fixed number of transform blocks of a smaller size (for example, divided into four smaller transform blocks or divided into two smaller transform blocks); a size of the transform block cannot exceed a maximum transform block size allowed in a video coding and decoding system; and the size of the transform block cannot be smaller than a minimum transform block size allowed in the video coding and decoding system. Therefore, a size of a post-dividing transform block may also be determined by using information of the transform block (a height of the transform block, a width of the transform block, an average value of a height and a width of the transform block, a preset maximum transform block size, and a preset minimum transform block size) and the dividing manner of the image block, or using only the information of the transform block, in addition to using a dividing layer number and the dividing manner of the image block.

The following describes, by taking the image block dividing manner N×2N as an example, a method for obtaining a size of a post-dividing transform block according to the dividing manner of the image block and a numerical relationship between the width and the height of the transform block, or only according to a numerical relationship between the width and the height of the transform block. It is assumed that a size of an image block is 2M×2M, a preset maximum transform block size is 2M, and a preset minimum transform block size is 0.25M. A transform block is divided according to a one-into-four rule. That is, a transform block is always divided into four transform blocks of a smaller size. The smaller size may be that a width of a post-dividing transform block is smaller than a width of a pre-dividing transform block; or a height of a post-dividing transform block is smaller than a height of a pre-dividing transform block; or both a width and a height of a post-dividing transform block are smaller than a width and a height of a pre-dividing transform block. It is assumed that an initial size of the transform block is equal to the size of the image block.

In an embodiment of the present disclosure, a size of a post-dividing transform block is determined according to a numerical relationship between the width and the height of the pre-dividing transform block as well as a numerical relationship between the width and height of the pre-dividing transform block and the preset maximum transform block size.

The numerical relationship may be "greater than", "equal to", or "smaller than".

Figure 14:
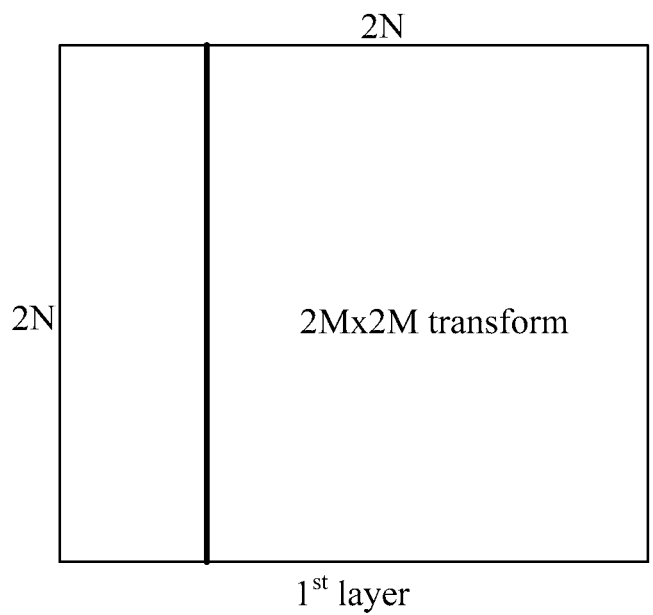
FIG. 14 to FIG. 17 are schematic diagrams of dividing a transform block according to an embodiment of the present disclosure.
Figure 15:
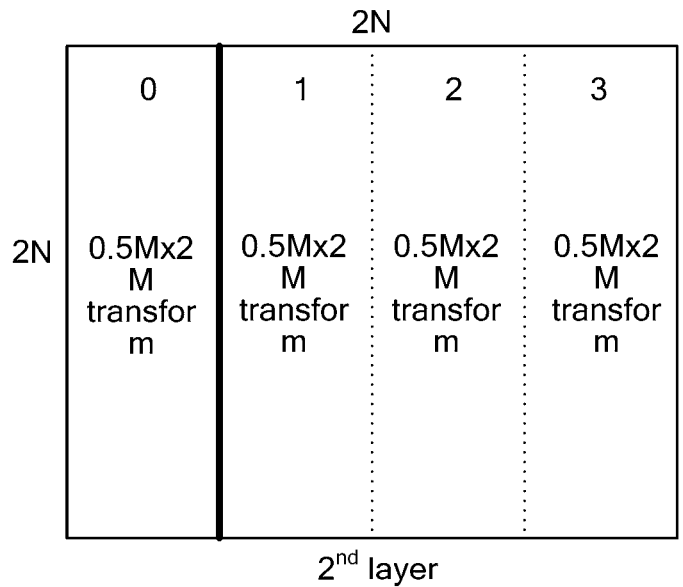

A transform block is always divided in a larger-to-smaller manner, and the initial size of the transform block is equal to the size of the image block. In this case, the size of the transform block is 2M×2M, as shown in FIG. 14. When both the width and the height of the pre-dividing transform block are equal to a width and a height of the image block, and the width of the pre-dividing transform block is equal to the height of the pre-dividing transform block, it may be known that the transform block is not yet further divided. According to preceding content, in this case, the following two rules are followed during dividing of the transform block: 1. During the dividing of the transform block, a ratio relationship between the width and the height of a post-dividing transform block depends on the dividing manner of the image block; 2. The transform block is divided according to a one-into-four method. Therefore, it may be known that the transform block needs to be divided into four 0.5M×2M transform blocks along a vertical direction, as shown in FIG. 15.

In addition, the size of the transform block must be smaller than or equal to the preset maximum transform block size. When the initial size of the transform block is equal to the size of the image block and the size of the image block is greater than the preset maximum transform block size, the initial size of the transform block is also greater than the preset maximum transform block size. In this case, the transform block is divided into four transform blocks whose width and height are half of the width and the height of the original transform block. When the size of the transform block is smaller than or equal to the preset maximum transform block size and the width of the transform block is equal to the height of the transform block, same as the preceding method, in this case, the transform block is divided according to the dividing manner of the image block, and the transform block is divided into four transform blocks of a smaller size. Therefore, a width of a post-dividing transform block is four times a height of the post-dividing transform block.

In the preceding process, the information of the transform block and the dividing manner of the image block are used to determine whether the transform block needs to be divided and the size of the post-dividing transform block.

When the width or the height of the transform block is smaller than the preset maximum transform block size, and the width of the transform block is not equal to the height of the transform block, it may be known that the transform block has already been divided according to the dividing manner of the image block, and in this case, it is assumed that a size of a pre-dividing transform block is 0.5M×2M. When it is determined that transform blocks marked with 0 and 3 in FIG. 15 need to be further divided into transform blocks of a smaller size, according to the preceding dividing rule, if the transform blocks are still divided along a horizontal direction, a size of a transform block obtained through dividing is 0.25M×2M; if the transform blocks are divided along a vertical direction, a size of a transform block obtained through dividing is 0.5M×0.5M. Sizes of post-dividing transform blocks obtained in the two dividing manners both differ from a size (M×2M) of the prediction block to a certain extent. Therefore, it may be known that the size 0.25M×M of a transform block obtained through dividing the transform block along the horizontal direction and the vertical direction is an optimal dividing size, as shown in FIG. 16.

In the preceding process, only the information of the transform block is used to determine whether the transform block needs to be divided and the size of the post-dividing transform block.

Figure 16:
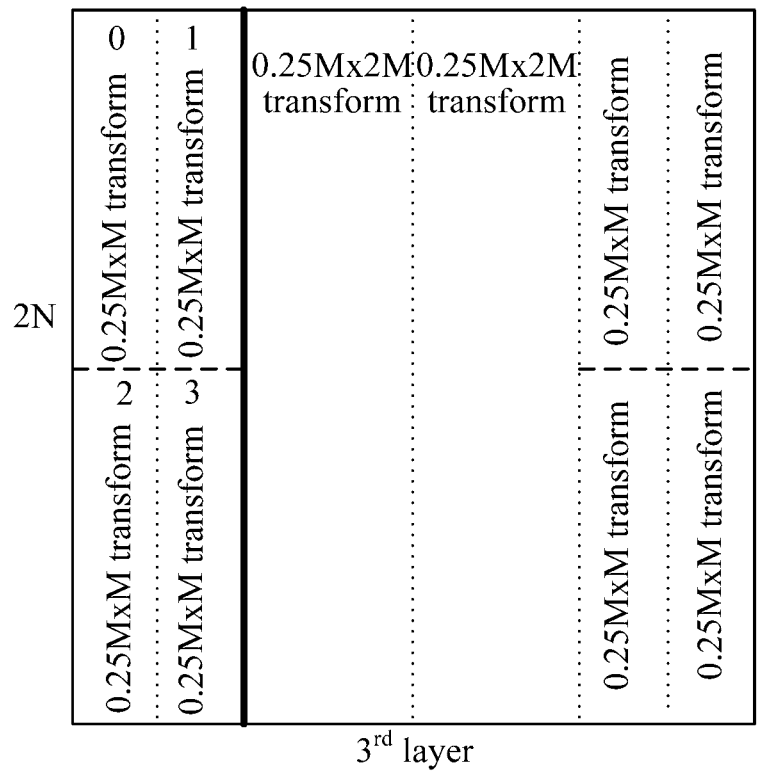
Figure 17:
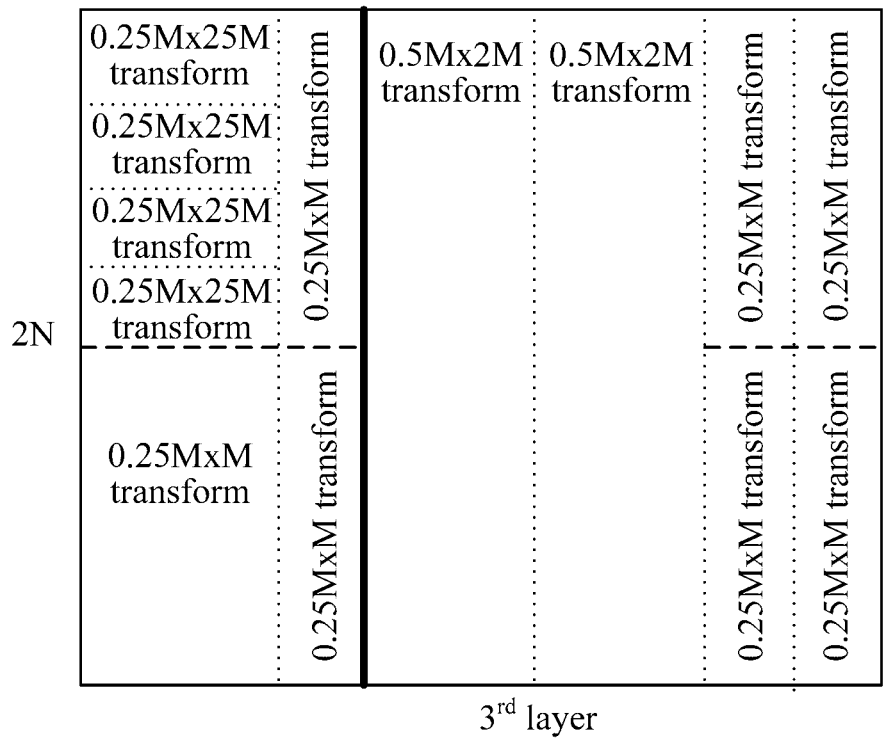

If it is determined that a transform block marked with 0 in FIG. 16 needs to be further divided into transform blocks of a smaller size, and when the width or the height of the pre-dividing transform block is equal to the preset minimum transform block size, for example, when the width is equal to 0.25M in this example, dividing along the horizontal direction and the vertical direction according to the preceding method cannot be performed even if the width of the pre-dividing transform block is not equal to the height of the pre-dividing transform block; otherwise, a width or a height of a post-dividing transform block is smaller than the preset minimum transform block size. In this case, to enable the transform block to be further divided into transform blocks of a smaller size, the transform block may be divided along another direction (a direction where sides of the transform block are greater than the preset minimum transform block size) to obtain transform blocks of a smaller size. In this example, the transform block is divided along the vertical direction to obtain four 0.25M×0.25M transform blocks, as shown in FIG. 17.

In the preceding process, only the information of the transform block is used to determine whether the transform block needs to be divided and the size of the post-dividing transform block.

In the preceding steps, whether the transform block needs to be divided and the size of the post-dividing transform block are determined only according to the information of the transform block and the dividing manner of the image block, or only according to the information of the transform block. In addition, the processes described in the preceding steps are intended to explain how to determine, according to the width and the height of the transform block and the dividing manner of the image block, or only according to the width and the height of the transform block, whether the transform block needs to be divided and the size of the post-dividing transform block; and explain principles of determination and dividing. In a specific practical process, only the information of the transform block and the dividing manner of the image block or only the information of the transform block needs to be used. The following is a specific example.

It is assumed that a size of an image block is 32×32; a dividing manner of the image block is a vertical dividing manner, that is, the dividing manner of the image block is one of N×2N, nL×2N, and nR×2N; a preset maximum transform block size is 16; and a preset minimum transform block size is 4. It is assumed that a width and a height of the transform block are represented by using parameters log 2TrafoHeight and log 2TrafoWidth. A relationship between the height of the transform block and log 2TrafoHeight is as follows: Height of the transform block=1<<log 2TrafoHeight; and a relationship between the width of the transform block and log 2TrafoWidth is as follows: Width of the transform block=1<<log 2TrafoWidth. Therefore, initial values of both log 2TrafoHeight and log 2TrafoWidth are 5, the preset maximum transform block size represented in an exponential form is 4, and the preset minimum transform block size represented in an exponential form is 2. In addition, a size parameter of the transform block may also be represented by using log 2TrafoSize. A relationship between log 2TrafoSize, log 2TrafoHeight, and log 2TrafoWidth is log 2TrafoSize=(log 2TrafoHeight+log 2TrafoHeight)>>1.

In the preceding arithmetic operation, "<<" represents a left shift operation, 1<<log 2TrafoHeight is equivalent to a $2^{log2TrafoHeight}$ operation, 1<<log 2TrafoWidth is equivalent to a $2^{log2TrafoWidth}$ operation, and 1<<log 2TrafoSize is equivalent to a $2^{log2TrafoSize}$ operation; and ">>" represents a right shift operation, (log 2TrafoHeight+log 2TrafoHeight)>>1 is equivalent to an operation of (log 2TrafoHeight+log 2TrafoHeight)/2, and the following is the same.

It can be known from the preceding description that, log 2TrafoHeight, log 2TrafoWidth, and log 2TrafoSize represent a size of the transform block in an exponential form. Therefore, when the transform block is divided into smaller sub-transform blocks, a change to the size of the transform block may be reflected by addition or subtraction of numerical values of the parameters log 2TrafoHeight, log 2TrafoWidth, and log 2TrafoSize. For example, when a size of a current transform block is 16×16, a value of log 2TrafoHeight is 4, a value of log 2TrafoWidth is 4, and a value of log 2TrafoSize is 4. When the transform block is divided into 16×4 sub-transform blocks, the size changes to 16×4. In this case, the value of log 2TrafoWidth does not change and is still 4, the value of log 2TrafoHeight changes to 2 (4−2), and the value of log 2TrafoSize changes to 3 (4−1, that is, an average value of 4 and 2).

In the step of determining whether a width or a height of a transform block is equal to the preset minimum transform block size, an average value (log 2TrafoSize) of the width and the height of the transform block may also be used for the determination. In the preceding method, the width (or height) of a post-dividing transform block is one fourth of the width (or height) of a pre-dividing transform block, but the height (or width) of the post-dividing transform block does not change. That is, a value of log 2TrafoWidth or log 2TrafoHeight of the post-dividing transform block is a value of log 2TrafoWidth or log 2TrafoHeight of the pre-dividing transform block minus 2, but a value of log 2TrafoHeight (or log 2TrafoWidth) of the transform block does not change. It may be known that, when the value of log 2TrafoHeight is not equal to log 2TrafoWidth, the value of log 2TrafoSize is always greater than a smallest value of log 2TrafoHeight and log 2TrafoWidth plus 1. Therefore, when the value of log 2TrafoSize is equal to the preset minimum transform block size plus 1, a value of one parameter of log 2TrafoHeight and log 2TrafoWidth is surely equal to the preset minimum transform block size; and a parameter whose value is equal to the preset minimum transform block size may be known through a numerical relationship (greater than, equal to, or smaller than) between log 2TrafoHeight and log 2TrafoWidth.

Initial values of the width and the height of the transform block are 5, and both the height (log 2TrafoHeight) of the transform block and the width (log 2TrafoWidth) of the transform block are greater than the preset maximum transform block size 4 (the value of log 2TrafoSize is also 5, greater than the preset maximum transform block size). Therefore, the transform block is divided into four sub-transform blocks whose height and width are both 4. In this case, when a transform block obtained through dividing is further divided, because both the height and the width of the transform block are 4 (the value of log 2TrafoSize is 4) and equal to the preset maximum transform block size 4, and the dividing manner of the image block is N×2N, nL×2N, or nR×2N, a height of a post-dividing transform block is still 4, a width of a post-dividing transform block decrements by 2 to 2, and a value of log 2TrafoSize is 3. In this case, when a transform block obtained through dividing is further divided, because the width of the transform block is 2 and equal to the preset minimum transform block size 2 (the value of log 2TrafoSize is equal to the preset minimum transform block size plus 1), a width of a post-dividing transform block does not change and is still 2, and a height of the post-dividing transform block decrements by 2 to 2.

When the dividing manner of the image block is the horizontal dividing manner, that is, when the dividing manner of the image block is one of 2N×N, 2N×nU, and 2N×nD, principles of dividing the transform block are consistent with the preceding method, and details are not repeatedly described herein. Here, that a size of an image block is 32×32 is still taken as an example, a preset maximum transform block size is 16, and a preset minimum transform block size is 4. Initial values of a width and a height of a transform block are 5, and both the height (log 2TrafoHeight) of the transform block and the width (log 2TrafoWidth) of the transform block are greater than the preset maximum transform block size 4 (a value of log 2TrafoSize is also 5, greater than the preset maximum transform block size). Therefore, the transform block is divided into four sub-transform blocks whose height and width are both 4. In this case, when a transform block obtained through dividing is further divided, because both the height and the width of the transform block are 4 (a value of log 2TrafoSize is 4) and equal to the preset maximum transform block size 4, and the dividing manner of the image block is 2N×N, 2N×nU, or 2N×nD, a width of a post-dividing transform block is still 4, a height of the post-dividing transform block decrements by 2 to 2, and a value of log 2TrafoSize is 3. In this case, when a transform block obtained through dividing is further divided, because the height of the transform block is 2 and equal to the preset minimum transform block size 2 (the value of log 2TrafoSize is equal to the preset minimum transform block size plus 1), a height of a post-dividing transform block does not change and is still 2, and a width of the post-dividing transform block decrements by 2 to 2.

In addition, the maximum transform block size or the minimum transform block size (also called a maximum size or a minimum size of a transform block) may also refer to information of pixels included in a transform block. In this case, the maximum transform block size or the minimum transform block size may be represented by a product of multiplying a width and a height of a transform block. Therefore, in the step of determining whether a width or a height of a transform block is equal to the preset minimum transform block size (a minimum size value), a product of multiplying the width and the height of the transform block may also be used for the determination. In the preceding method, a width (or height) of a post-dividing transform block is one fourth of the width (or height) of the pre-dividing transform block, but the height (or width) of the post-dividing transform block does not change. That is, a value of log 2TrafoWidth or log 2TrafoHeight of the post-dividing transform block is a value of log 2TrafoWidth or log 2TrafoHeight of the pre-dividing transform block minus 2, but a value of log 2TrafoHeight (or log 2TrafoWidth) of the transform block does not change. It may be known that, when the value of log 2TrafoHeight is not equal to log 2TrafoWidth, the value of log 2TrafoSize is always greater than a smallest value of log 2TrafoHeight and log 2TrafoWidth plus 1. Therefore, same as the preceding principles, when a product of multiplying log 2TrafoHeight and log 2TrafoWidth is equal to four times the preset minimum transform block size, it may be known through a numerical relationship (greater than, equal to, or smaller than) between log 2TrafoHeight and log 2TrafoWidth that the transform block needs to be divided along a direction of a long side.

Initial values of the width and the height of the transform block are 5. It is assumed that a maximum transform block size is 16×16, and a minimum transform block size is 4×4. A product of multiplying the height (log 2TrafoHeight) of the transform block and the width (log 2TrafoWidth) of the transform block is greater than the preset maximum transform block size. Therefore, the transform block is divided into four sub-transform blocks whose height and width are both 4. In this case, when a transform block obtained through dividing is further divided, because both the height and the width of the transform block are 4 (the value of log 2TrafoSize is 4), a product of multiplying the height and the width is equal to the preset maximum transform block size and the dividing manner of the image block is N×2N, nL×2N, or nR×2N, a height of a post-dividing transform block is still 4, a width of the post-dividing transform block decrements by 2 to 2, and a value of log 2TrafoSize is 3. In this case, when a transform block obtained through dividing is further divided, because the width of the transform block is 2 and equal to the preset minimum transform block size, a width of a post-dividing transform block does not change and is still 2, and a height of the post-dividing transform block decrements by 2 to 2.

When the dividing manner of the image block is the horizontal dividing manner, that is, when the dividing manner of the image block is one of 2N×N, 2N×nU, and 2N×nD, principles of dividing the transform block are consistent with the preceding method, and details are not repeatedly described herein. Here, that a size of an image block is 32×32 is still taken as an example, a preset maximum transform block size is 16×16, and a preset minimum transform block size is 4×4. Initial values of both a width and a height of a transform block are 5. A product of multiplying the height (log 2TrafoHeight) of the transform block and the width (log 2TrafoWidth) of the transform block is greater than the preset maximum transform block size. Therefore, the transform block is divided into four sub-transform blocks whose height and width are both 4. In this case, when a transform block obtained through dividing is further divided, because both the height and the width of the transform block are 4 (the value of log 2TrafoSize is 4) and equal to the preset maximum transform block size 4, and the dividing manner of the image block is 2N×N, 2N×nU, or 2N×nD, a width of a post-dividing transform block is still 4, a height of the post-dividing transform block decrements by 2 to 2, and a value of log 2TrafoSize is 3. In this case, when a transform block obtained through dividing is further divided, because the height of the transform block is 2 and equal to the preset minimum transform block size, a height of a post-dividing transform block does not change and is still 2, and a width of the post-dividing transform block decrements by 2 to 2.

In the preceding method, when the dividing manner of the image block and the numerical relationship between the width and the height of the pre-dividing transform block meet a specific condition, values of a width and a height of a post-dividing transform block change compared with values of the width and the height of the pre-dividing transform block. According to the preceding steps and principles, it can be known that there are the following three cases for a change in the size of the post-dividing transform block:

I. The width of the post-dividing transform block is equal to the width of the pre-dividing transform block, and the height of the post-dividing transform block is smaller than the height of the pre-dividing transform block.

II. The height of the post-dividing transform block is equal to the height of the pre-dividing transform block, and the width of the post-dividing transform block is smaller than the width of the pre-dividing transform block.

III. The width of the post-dividing transform block is smaller than the width of the pre-dividing transform block, and the height of the post-dividing transform block is smaller than the height of the pre-dividing transform block.

Therefore, a parameter interTUSplitDirection may be set to identify a relationship between the size of the post-dividing transform block and the size of the pre-dividing transform block, so as to obtain the size of the post-dividing transform block. A value of interTUSplitDirection is set to 0, 1, or 2 to respectively represent the preceding three cases I, II, and III.

The value of interTUSplitDirection is 0 when the dividing manner of the image block and the numerical relationship between the width and the height of the transform block meet or the numerical relationship between the width and the height of the transform block meets one of the following conditions:

the dividing manner of the image block is the horizontal dividing manner, the width of the pre-dividing transform block is equal to the height of the pre-dividing transform block, both the width and the height of the pre-dividing transform block are smaller than or equal to the preset maximum transform block size, and both the width and the height of the pre-dividing transform block are greater than or equal to the preset minimum transform block size;

the dividing manner of the image block is the horizontal dividing manner, the width of the pre-dividing transform block is equal to the height of the pre-dividing transform block, an average value of the width and the height of the pre-dividing transform block is smaller than or equal to the preset maximum transform block size, and the average value of the width and the height of the pre-dividing transform block is greater than or equal to the preset minimum transform block size;

the width of the pre-dividing transform block is equal to the preset minimum transform block size, and the height of the pre-dividing transform block is greater than the width of the pre-dividing transform block; and an average value of the width of the pre-dividing transform block and the height of the pre-dividing transform block is equal to the preset minimum transform block size plus 1, and the height of the pre-dividing transform block is greater than the width of the pre-dividing transform block.

The value of interTUSplitDirection is 1 when the dividing manner of the image block and the numerical relationship between the width and the height of the transform block meet or the numerical relationship between the width and the height of the transform block meets one of the following conditions:

the dividing manner of the image block is the vertical dividing manner, the width of the pre-dividing transform block is equal to the height of the pre-dividing transform block, both the width and the height of the pre-dividing transform block are smaller than or equal to the preset maximum transform block size, and both the width and the height of the pre-dividing transform block are greater than or equal to the preset minimum transform block size;

the dividing manner of the image block is the vertical dividing manner, the width of the pre-dividing transform block is equal to the height of the pre-dividing transform block, an average value of the width and the height of the pre-dividing transform block is smaller than or equal to the preset maximum transform block size, and the average value of the width and the height of the pre-dividing transform block is greater than or equal to the preset minimum transform block size;

the height of the pre-dividing transform block is equal to the preset minimum transform block size, and the width of the pre-dividing transform block is greater than the height of the pre-dividing transform block; and an average value of the height of the pre-dividing transform block and the width of the pre-dividing transform block is equal to the preset minimum transform block size plus 1, and the width of the pre-dividing transform block is greater than the height of the pre-dividing transform block.

Figure 18:
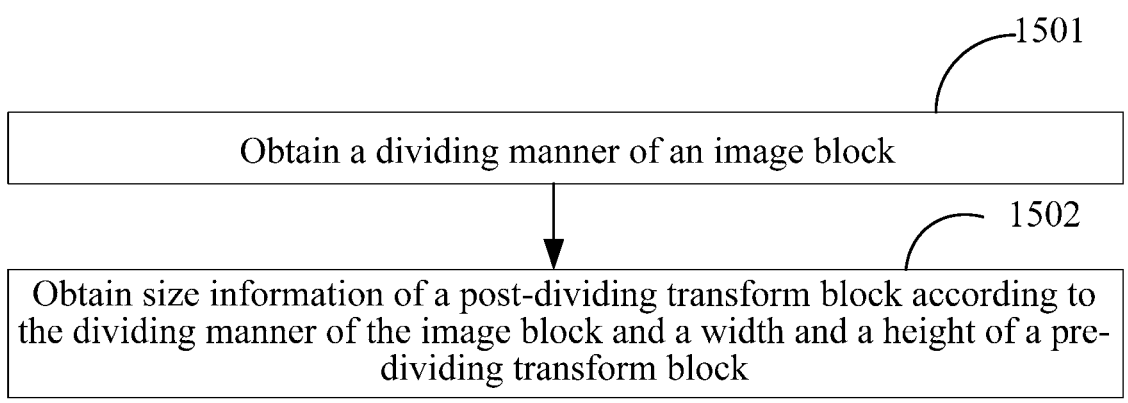
FIG. 18 is a method for obtaining a size of a transform block according to an embodiment of the present disclosure.

Otherwise (when the dividing manner of the image block and the numerical relationship between the width and the height of the transform block do not meet or the numerical relationship between the width and the height of the transform block does not meet the preceding conditions), the value of interTUSplitDirection is 2. Based on the foregoing description, referring to FIG. 18, an embodiment of the present disclosure further provides a method for obtaining a size of a transform block. The method includes:

Step 1501: Obtain a dividing manner of an image block.

Step 1502: Obtain size information of a post-dividing transform block according to the dividing manner of the image block and a width and a height of a pre-dividing transform block.

In this embodiment of the present disclosure, size information of a transform block refers to a width or a height of the transform block and other information used to indicate the width or the height of the transform block.

Figure 19:
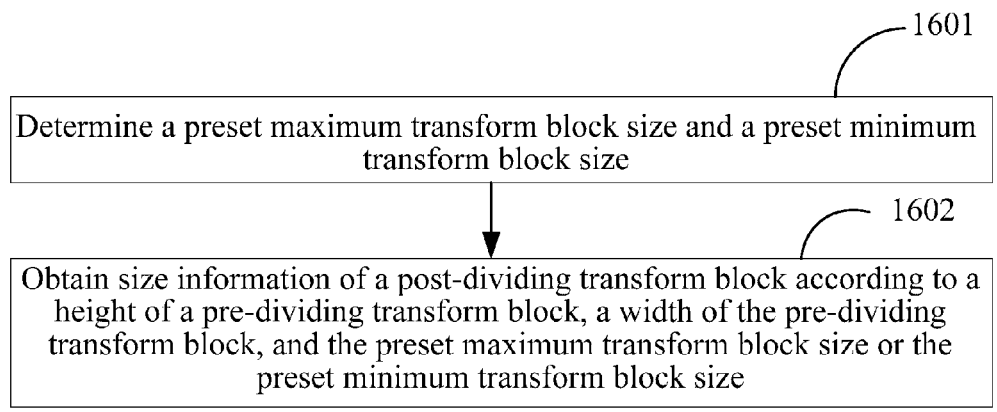
FIG. 19 is a method for obtaining a size of a transform block according to another embodiment of the present disclosure.

Similarly, referring to FIG. 19, an embodiment of the present disclosure further provides a method for obtaining a size of a transform block. The method includes:

Step 1601: Determine a preset maximum transform block size and a preset minimum transform block size.

Step 1602: Obtain size information of a post-dividing transform block according to a height of a pre-dividing transform block, a width of the pre-dividing transform block, and the preset maximum transform block size or the preset minimum transform block size.

The preset maximum transform block size may be determined before a video sequence is coded; may also be determined before an image is coded; may also be determined before a stripe is coded; and may also be determined before an image block, a prediction block, or a transform block is coded. The preset maximum transform block size may be determined when a video sequence header or a sequence parameter set is decoded; may also be determined when an image header or an image parameter set is decoded; may also be determined when supplemental enhancement information (Supplemental enhancement information) is decoded; and may also be determined when an image block, a prediction block, or a transform block is decoded.

The preset minimum transform block size may be determined before a video sequence is coded; may also be determined before an image is coded; may also be determined before a stripe is coded; and may also be determined before an image block, a prediction block, or a transform block is coded. The preset minimum transform block size may be determined when a video sequence header or a sequence parameter set is decoded; may also be determined when an image header or an image parameter set is decoded; may also be determined when supplemental enhancement information (Supplemental enhancement information) is decoded; and may also be determined when an image block, a prediction block, or a transform block is decoded.

In addition, the maximum transform block size or the minimum transform block size may also refer to information of pixels included in a transform block. In this case, the maximum transform block size or the minimum transform block size may be represented by a product of multiplying a width and a height of a transform block.

By using the method for obtaining a size of a transform block provided in this embodiment of the present disclosure, a size of a transform block may be coded according to a dividing manner of an image block or a height and a width of a pre-dividing transform block, thereby effectively improving coding efficiency.

Figure 20:
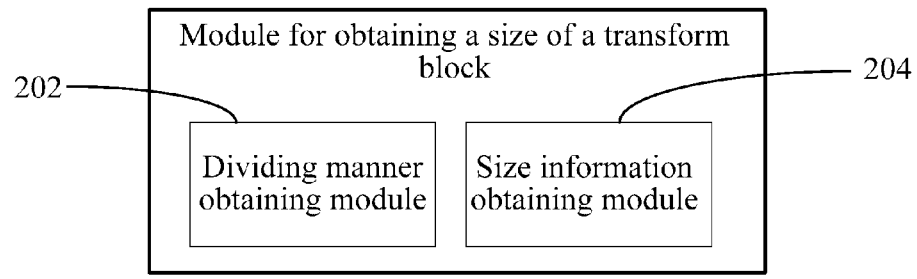
FIG. 20 and FIG. 21 are schematic diagrams of modules for obtaining a size of a transform block according to embodiments of the present disclosure.

Referring to FIG. 20, the present disclosure further provides a module for obtaining a size of a transform block, where the module is configured to execute the preceding steps 1501 and 1502, and includes:

a dividing manner obtaining module 202, configured to obtain a dividing manner of an image block; and a size information obtaining module 204, configured to obtain size information of a post-dividing transform block according to the dividing manner of the image block and a width and a height of a pre-dividing transform block.

Specific working methods of the preceding modules are already described in the foregoing, and details are not repeatedly described herein.

Figure 21:
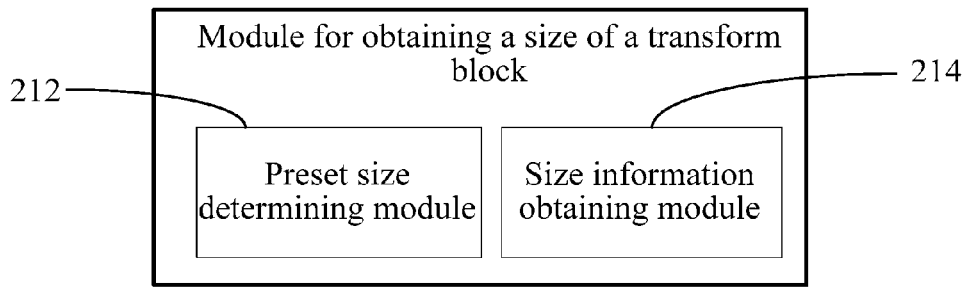

Referring to FIG. 21, an embodiment of the present disclosure further provides a module for obtaining a size of a transform block, where the module is configured to execute steps 1601 and 1602, and includes:

a preset size determining module 212, configured to determine a preset maximum transform block size and a preset minimum transform block size; and a size information obtaining module 214, configured to obtain size information of a post-dividing transform block according to a height of a pre-dividing transform block, a width of the pre-dividing transform block, and the preset maximum transform block size or the preset minimum transform block size.

Specific working methods of the preceding modules are already described in the foregoing, and details are not repeatedly described herein.

A person of ordinary skill in the art may understand that all or a part of the steps in the methods of the foregoing embodiments may be implemented by a program instructing relevant hardware. The program may be stored in a computer readable storage medium, such as a read-only memory, a magnetic disk, or an optical disk.

A method and a module for obtaining a size of a transform block provided in the embodiments of the present disclosure are described in detail in the foregoing. Specific examples are used in this specification for illustrating principles and implementation manners of the present disclosure. The description of the foregoing embodiments is merely used to help understanding of the methods and core ideas of the present disclosure. Meanwhile, a person of ordinary skill in the art may make variations to the specific implementation manners and application scopes according to the ideas of the present disclosure. In conclusion, the content of this specification should not be construed as a limitation on the present disclosure.

What is claimed is:

1. A method for obtaining a size of a transform block implemented by a hardware processor coupled to a memory, the method comprising:
    obtaining, by the hardware processor, a dividing manner of an image block;
    obtaining, by the hardware processor, size information of a post-dividing transform block according to the dividing manner of the image block, a width and a height of a pre-dividing transform block according to the dividing manner; and
    storing, by the hardware processor, the obtained size information in the memory coupled with the processor;
    wherein the dividing manner is a horizontal or vertical dividing manner that determines a relationship between the pre-dividing transform blocks and the post-dividing transform blocks, and wherein the width and the height of the pre-dividing transform block are equal, one dimension of the pre-dividing transform block is equal to another dimension of the post-dividing transform block, a dimension being a width or a height, and a mathematical relationship between the width of the pre-dividing transform block and the height of the pre-dividing transform block is selected from the group consisting of:
    (a) an average value of the width and the height of the pre-dividing transform block is greater than or equal to a preset minimum transform block size and less than or equal to a preset maximum transform block size, and
    (b) a product multiplying the width and the height of the pre-dividing transform block is greater than or equal to the preset minimum transform block size and less than or equal to the preset maximum transform block size.

2. The method according to claim 1, wherein the obtaining the size information of the post-dividing transform block comprises:
    obtaining the size information of the post-dividing transform block according to a numerical relationship between the width and the height of the pre-dividing transform block.

3. The method according to claim 2, wherein the numerical relationship comprises one of "greater than", "equal to", and "smaller than".

4. The method according to claim 1, wherein the obtaining the size information of the post-dividing transform block comprises:
    obtaining a dividing direction parameter according to the dividing manner of the image block and a numerical relationship between the width and the height of the pre-dividing transform block; and
    obtaining a size of the post-dividing transform block according to the dividing direction parameter and values of the width and the height of the pre-dividing transform block.

5. The method according to claim 1, wherein:
    when the dividing manner of the image block is the horizontal dividing manner and the width of the pre-dividing transform block is equal to the height of the pre-dividing transform block, a width of the post-dividing transform block is equal to the width of the pre-dividing transform block, and a height of the post-dividing transform block is smaller than the height of the pre-dividing transform block; or when the dividing manner of the image block is the vertical dividing manner and the width of the pre-dividing transform block is equal to the height of the pre-dividing transform block, the height of the post-dividing transform block is equal to the height of the pre-dividing transform block, and the width of the post-dividing transform block is smaller than the width of the pre-dividing transform block.

6. The method according to claim 5, wherein:

the width of the post-dividing transform block is equal to the width of the pre-dividing transform block, and the height of the post-dividing transform block is smaller than the height of the pre-dividing transform block when the dividing manner of the image block is the horizontal dividing manner, the width of the pre-dividing transform block is equal to the height of the pre-dividing transform block, both the width and the height of the pre-dividing transform block are smaller than or equal to the preset maximum transform block size, and both the width and the height of the pre-dividing transform block are greater than or equal to the preset minimum transform block size; or the height of the post-dividing transform block is equal to the height of the pre-dividing transform block, and the width of the post-dividing transform block is smaller than the width of the pre-dividing transform block when the dividing manner of the image block is the vertical dividing manner, the width of the pre-dividing transform block is equal to the height of the pre-dividing transform block, both the width and the height of the pre-dividing transform block are smaller than or equal to the preset maximum transform block size, and both the width and the height of the pre-dividing transform block are greater than or equal to the preset minimum transform block size.

7. The method according to claim 1, wherein:

a width of the post-dividing transform block is equal to the width of the pre-dividing transform block, and a height of the post-dividing transform block is smaller than the height of the pre-dividing transform block when the dividing manner of the image block is the horizontal dividing manner, the width of the pre-dividing transform block is equal to the height of the pre-dividing transform block, an average value of the width and the height of the pre-dividing transform block is smaller than or equal to the preset maximum transform block size, and the average value of the width and the height of the pre-dividing transform block is greater than or equal to the preset minimum transform block size; or the height of the post-dividing transform block is equal to the height of the pre-dividing transform block, and the width of the post-dividing transform block is smaller than the width of the pre-dividing transform block when the dividing manner of the image block is the vertical dividing manner, the width of the pre-dividing transform block is equal to the height of the pre-dividing transform block, the average value of the width and the height of the pre-dividing transform block is smaller than or equal to the preset maximum transform block size, and the average value of the width and the height of the pre-dividing transform block is greater than or equal to the preset minimum transform block size.

8. The method according to claim 6, wherein the preset maximum transform block size comprises a preset maximum value of a transform block height, a preset maximum value of a transform block width, or a preset maximum average value of the transform block height and the transform block width; and the preset minimum transform block size comprises a preset minimum value of the transform block height, a preset minimum value of the transform block width, or a preset minimum average value of the transform block height and the transform block width.

9. The method according to claim 1, wherein:

a width of the post-dividing transform block is equal to the width of the pre-dividing transform block, and a height of the post-dividing transform block is smaller than the height of the pre-dividing transform block when the dividing manner of the image block is the horizontal dividing manner, the width of the pre-dividing transform block is equal to the height of the pre-dividing transform block, a product of multiplying the width and the height of the pre-dividing transform block is smaller than or equal to the preset maximum transform block size, and the product of multiplying the width and the height of the pre-dividing transform block is greater than or equal to the preset minimum transform block size; or a height of the post-dividing transform block is equal to the height of the pre-dividing transform block, and a width of the post-dividing transform block is smaller than the width of the pre-dividing transform block when the dividing manner of the image block is the vertical dividing manner, the width of the pre-dividing transform block is equal to the height of the pre-dividing transform block, a product of multiplying the width and the height of the pre-dividing transform block is smaller than or equal to the preset maximum transform block size, and a product of multiplying the width and the height of the pre-dividing transform block is greater than or equal to the preset minimum transform block size.

10. The method according to claim 9, wherein the preset maximum transform block size comprises a preset maximum value of a product of multiplying a transform block height and a transform block width; and the preset minimum transform block size comprises a preset minimum value of the product of multiplying the transform block height and the transform block width.

11. A method for obtaining a size of a transform block implemented by a hardware processor coupled to a memory, comprising:

obtaining, by the hardware processor, size information of a post-dividing transform block according to a height of a pre-dividing transform block, a width of the pre-dividing transform block, and a preset maximum or minimum transform block size; and storing, by the hardware processor, the obtained size information in the memory coupled with the hardware processor;

wherein the size information is obtained according to a size relationship between the pre-dividing transform block, the preset minimum/maximum transform block and the post-dividing transform block, and wherein the width and the height of the pre-dividing transform block are equal, one dimension of the pre-dividing transform block is equal to another dimension of the post-dividing transform block, a dimension being a width or a height, and a mathematical relationship between the width of the pre-dividing transform block and the height of the pre-dividing transform block is selected from the group consisting of:
(a) an average value of the width and the height of the pre-dividing transform block is greater than or equal to the preset minimum transform block size and less than or equal to the preset maximum transform block size, and
(b) a product multiplying the width and the height of the pre-diving transform block is greater than or equal to the preset minimum transform block size and less than or equal to the preset maximum transform block size.

12. The method according to claim 11, wherein
the preset maximum transform block size comprises a preset maximum value of a transform block height, a preset maximum value of a transform block width, or a preset maximum average value of a transform block height and a transform block width; and
the preset minimum transform block size comprises a preset minimum value of the transform block height, a preset minimum value of the transform block width, or a preset minimum average value of the transform block height and the transform block width.

13. The method according to claim 12, wherein:
when the height of the pre-dividing transform block is equal to the preset minimum transform block size and the width of the pre-dividing transform block is greater than the height of the pre-dividing transform block, a height of the post-dividing transform block is equal to the height of the pre-dividing transform block, and a width of the post-dividing transform block is smaller than the width of the pre-dividing transform block; or
when the width of the pre-dividing transform block is equal to the preset minimum transform block size and the height of the pre-dividing transform block is greater than the width of the pre-dividing transform block, the width of the post-dividing transform block is equal to the width of the pre-dividing transform block, and the height of the post-dividing transform block is smaller than the height of the pre-dividing transform block.

14. The method according to claim 11, wherein:
when an average value of the height of the pre-dividing transform block and the width of the pre-dividing transform block is equal to the preset minimum transform block size plus 1 and the width of the pre-dividing transform block is greater than the height of the pre-dividing transform block, a height of the post-dividing transform block is equal to the height of the pre-dividing transform block, and a width of the post-dividing transform block is smaller than the width of the pre-dividing transform block; or
when an average value of the width of the pre-dividing transform block and the height of the pre-dividing transform block is equal to the preset minimum transform block size plus 1 and the height of the pre-dividing transform block is greater than the width of the pre-dividing transform block, the width of the post-dividing transform block is equal to the width of the pre-dividing transform block, and the height of the post-dividing transform block is smaller than the height of the pre-dividing transform block.

15. The method according to claim 11, wherein:
when the height of the pre-dividing transform block is not equal to the width of the pre-dividing transform block, and the width of the pre-dividing transform block and the height of the pre-dividing transform block are smaller than the preset maximum transform block size, a width of the post-dividing transform block is smaller than the width of the pre-dividing transform block, and a height of the post-dividing transform block is smaller than the height of the pre-dividing transform block; or
when the height of the pre-dividing transform block is not equal to the width of the pre-dividing transform block, and an average value of the width of the pre-dividing transform block and the height of the pre-dividing transform block is smaller than the preset maximum transform block size, the width of the post-dividing transform block is smaller than the width of the pre-dividing transform block, and the height of the post-dividing transform block is smaller than the height of the pre-dividing transform block.

16. The method according to claim 14, wherein the preset maximum transform block size comprises a preset maximum value of a transform block height, a preset maximum value of a transform block width, or a preset maximum average value of the transform block height and the transform block width; and the preset minimum transform block size comprises a preset minimum value of the transform block height, a preset minimum value of the transform block width, or a preset minimum average value of the transform block height and the transform block width.

17. The method according to claim 11, wherein:
when a product of multiplying the height of the pre-dividing transform block and the width of the pre-dividing transform block is equal to four times the preset minimum transform block size and the width of the pre-dividing transform block is greater than the height of the pre-dividing transform block, a height of the post-dividing transform block is equal to the height of the pre-dividing transform block, and a width of the post-dividing transform block is smaller than the width of the pre-dividing transform block; or
when a product of multiplying the width of the pre-dividing transform block and the height of the pre-dividing transform block is equal to four times the preset minimum transform block size and the height of the pre-dividing transform block is greater than the width of the pre-dividing transform block, the width of the post-dividing transform block is equal to the width of the pre-dividing transform block, and the height of the post-dividing transform block is smaller than the height of the pre-dividing transform block.

18. The method according to claim 17, wherein the preset maximum transform block size comprises a preset maximum value of a product of multiplying a transform block height and a transform block width; and the preset minimum transform block size comprises a preset minimum value of the product of multiplying the transform block height and the transform block width.

19. The method according to claim 11, wherein:
when the height of the pre-dividing transform block is not equal to the width of the pre-dividing transform block and a product of multiplying the width of the pre-dividing transform block and the height of the pre-dividing transform block is smaller than or equal to the preset maximum transform block size, a width of the post-dividing transform block is smaller than the width of the pre-dividing transform block, and a height of the post-dividing transform block is smaller than the height of the pre-dividing transform block.

20. An apparatus for obtaining a size of a transform block, comprising:
- a memory;
- a processor coupled to the memory, and wherein the processor is configured to:
- obtain size information of a post-dividing transform block according to a dividing manner of an image block and a width and a height of a pre-dividing transform block according to the dividing manner; wherein the dividing manner is a horizontal or vertical dividing manner that determines a relationship between the pre-dividing transform blocks and the post-dividing transform blocks, and wherein the width and the height of the pre-dividing transform block are equal, one dimension of the pre-dividing transform block is equal to another dimension of the post-dividing transform block, a dimension being a width or a height, and a mathematical relationship between the width of the pre-dividing transform block and the height of the pre-dividing transform block is selected from the group consisting of:
  - (a) an average value of the width and the height of the pre-dividing transform block is greater than or equal to a preset minimum transform block size and less than or equal to a preset maximum transform block size, and
  - (b) a product multiplying the width and the height of the pre-diving transform block is greater than or equal to the preset minimum transform block size and less than or equal to the preset maximum transform block size; and
- the memory is configured to store the size information obtained by the processor.

21. An apparatus for obtaining a size of a transform block, comprising:
- a memory;
- a processor coupled to the memory, and wherein the processor is configured to:
- obtain size information of a post-dividing transform block according to a height of a pre-dividing transform block, a width of the pre-dividing transform block, and a preset maximum or minimum transform block size, wherein the size information is obtained according to a size relationship between the pre-dividing transform block, the preset minimum/maximum transform block and the post-dividing transform block, and wherein the width and the height of the pre-dividing transform block are equal, one dimension of the pre-dividing transform block is equal to another dimension of the post-dividing transform block, a dimension being a width or a height, and a mathematical relationship between the width of the pre-dividing transform block and the height of the pre-dividing transform block is selected from the group consisting of:
  - (a) an average value of the width and the height of the pre-dividing transform block is greater than or equal to the preset minimum transform block size and less than or equal to the preset maximum transform block size, and
  - (b) a product multiplying the width and the height of the pre-diving transform block is greater than or equal to the preset minimum transform block size and less than or equal to the preset maximum transform block size; and
- the memory is configured to store the size information obtained by the processor.

* * * * *